US010265649B2

(12) United States Patent
Ettlinger et al.

(10) Patent No.: US 10,265,649 B2
(45) Date of Patent: Apr. 23, 2019

(54) DISCHARGE DEVICE AND DISCHARGE METHOD

(71) Applicant: ETTLINGER KUNSTSTOFFMASCHINEN GMBH, Königsbrunn (DE)

(72) Inventors: Roderich Ettlinger, Augsburg (DE); Thorsten Ettlinger, Schwabmünchen (DE)

(73) Assignee: ETTLINGER KUNSTSTOFFMASCHINEN GMBH, Königsbrunn (DE)

( * ) Notice: Subject to any disclaimer, the term of this patent is extended or adjusted under 35 U.S.C. 154(b) by 301 days.

(21) Appl. No.: 14/899,790

(22) PCT Filed: Jun. 18, 2014

(86) PCT No.: PCT/EP2014/062877
§ 371 (c)(1),
(2) Date: Dec. 18, 2015

(87) PCT Pub. No.: WO2014/202690
PCT Pub. Date: Dec. 24, 2014

(65) Prior Publication Data
US 2016/0136546 A1 May 19, 2016

(30) Foreign Application Priority Data

Jun. 18, 2013 (DE) .................... 20 2013 102 619 U
Jul. 25, 2013 (DE) .................... 20 2013 103 371 U

(51) Int. Cl.
*B01D 29/94* (2006.01)
*B01D 29/66* (2006.01)
(Continued)

(52) U.S. Cl.
CPC ............. *B01D 29/94* (2013.01); *B01D 29/64* (2013.01); *B01D 29/66* (2013.01);
(Continued)

(58) Field of Classification Search
CPC ........ B01D 29/94; B01D 29/64; B01D 29/66; B29C 47/0815; B29C 47/0884; B29C 47/68
(Continued)

(56) References Cited

U.S. PATENT DOCUMENTS 6,325,217 B1 * 12/2001 Hehenberger ......... B01D 35/12
210/341

FOREIGN PATENT DOCUMENTS

DE   10 2007 063 240 A1   7/2009
DE   10 2009 049355 A1    8/2010
(Continued)

*Primary Examiner* — Madeline Gonzalez
(74) *Attorney, Agent, or Firm* — McGlew and Tuttle, P.C.

(57) ABSTRACT

A discharge method and a discharge device for a cleaning device (2) for filters (5, 6), includes a supply line (26) which can be connected to a collection region (23) for removed filter residue (9) of the cleaning device (2). The discharge device (3) has a controllable metering device (4) which adjoins the supply line (26) and which blocks the supply line (26) and receives removed filter residue (9) from the supply line (26) in portions (35) in a meterable manner and discharges same at a different location. For this purpose, the metering device (4) has a metering element (28) which can be moved in a controllable manner, in particular a rotatably and/or movably arranged metering element. The filter residue (9) can be removed from the filter (5, 6) via a back-flushing process or in a mechanical manner using a scraper or the like.

20 Claims, 21 Drawing Sheets

(51) Int. Cl.
*B01D 29/64* (2006.01)
*B29C 47/68* (2006.01)
*B29C 47/08* (2006.01)

(52) U.S. Cl.
CPC ...... *B29C 47/0815* (2013.01); *B29C 47/0884* (2013.01); *B29C 47/68* (2013.01)

(58) Field of Classification Search
USPC ....... 210/791, 324, 327, 333.01, 333.1, 334, 210/341
See application file for complete search history.

(56) References Cited

FOREIGN PATENT DOCUMENTS

| EP | 0 073 076 A2 | 3/1983 |
| EP | 0 168 590 A1 | 1/1986 |
| WO | 2004/002715 A1 | 1/2004 |
| WO | 2012/079993 A2 | 6/2012 |

* cited by examiner

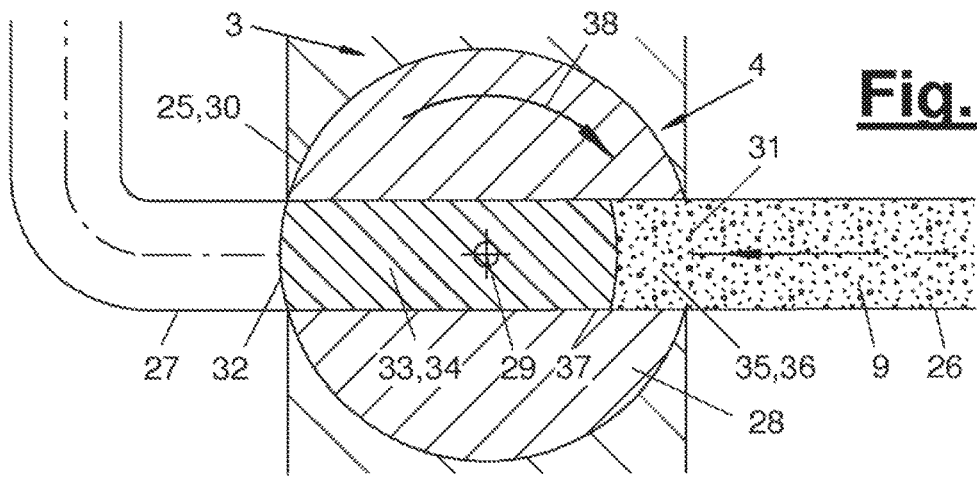
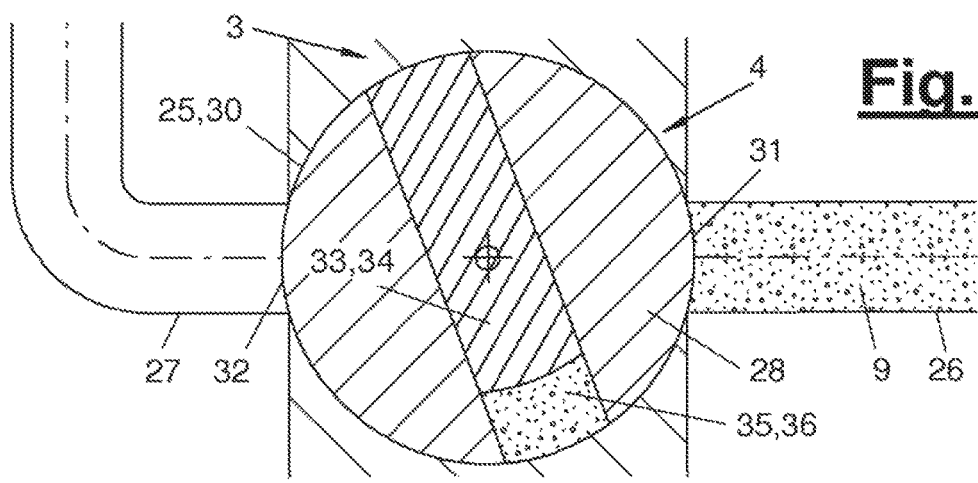
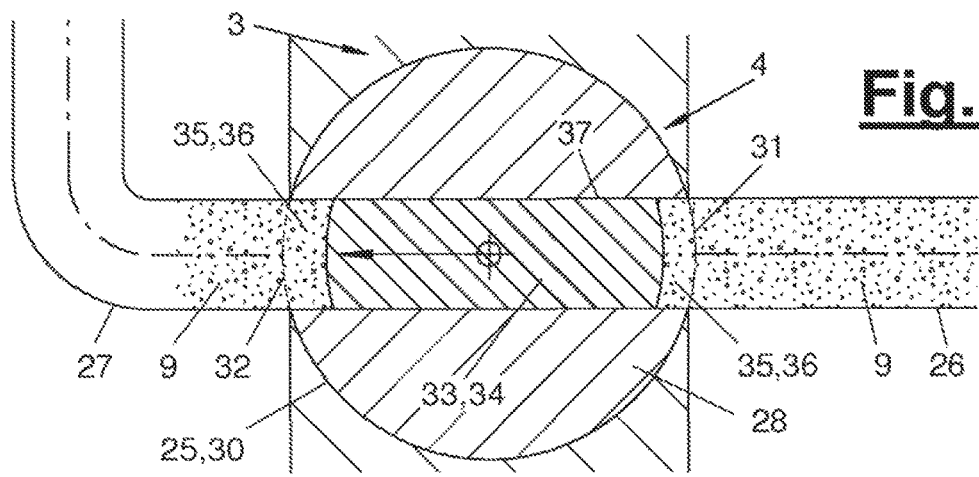

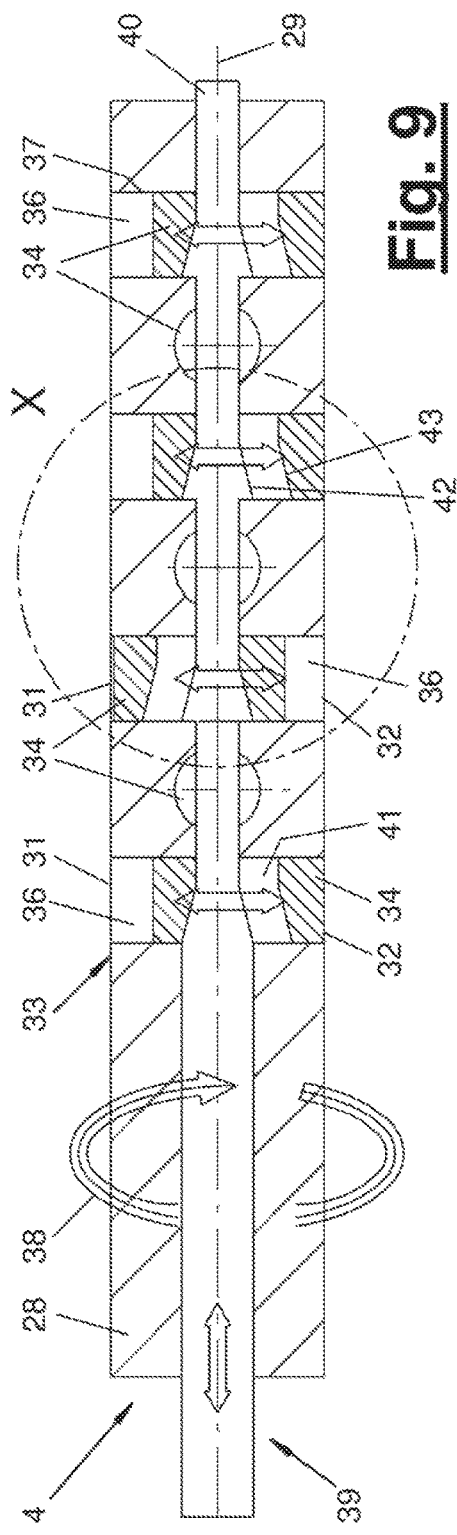
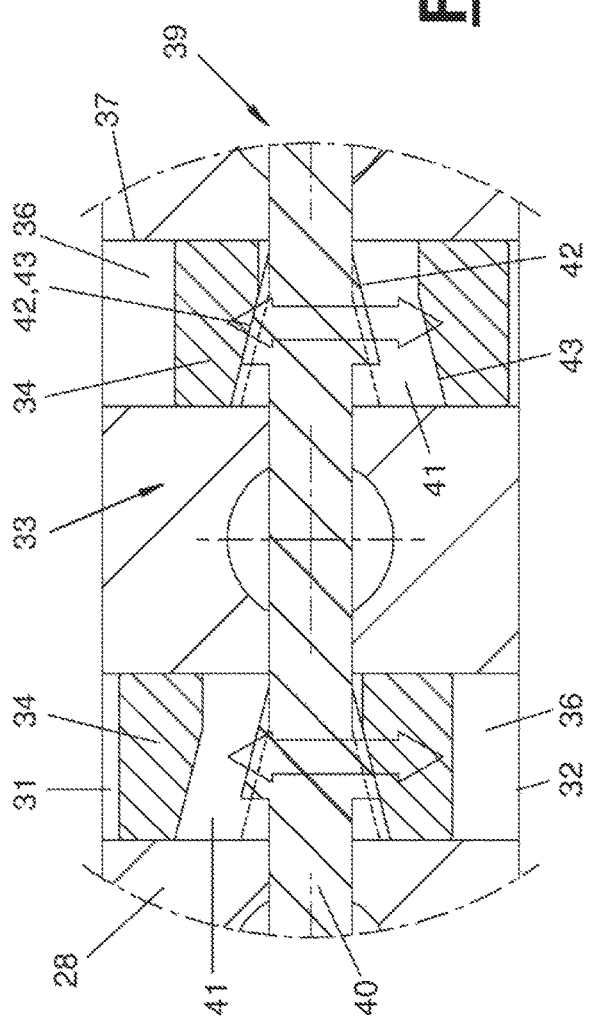

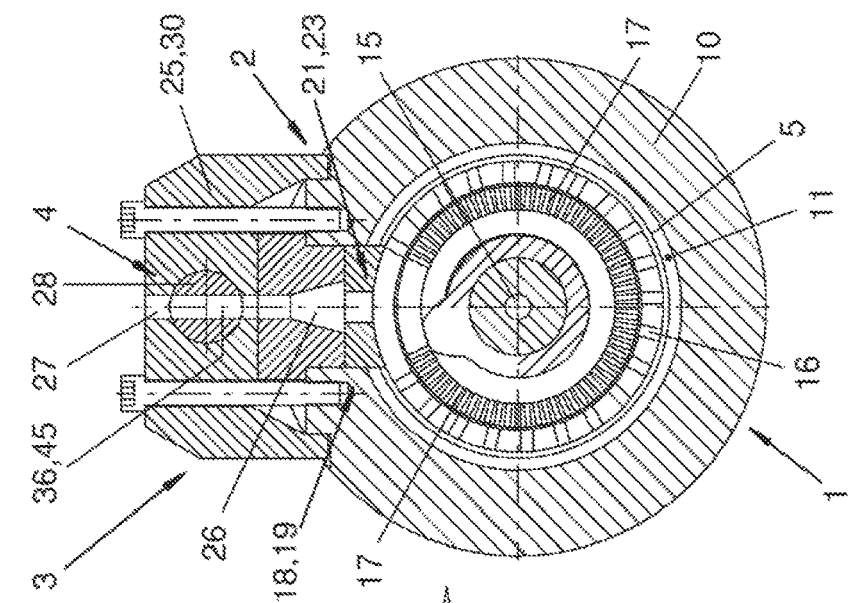

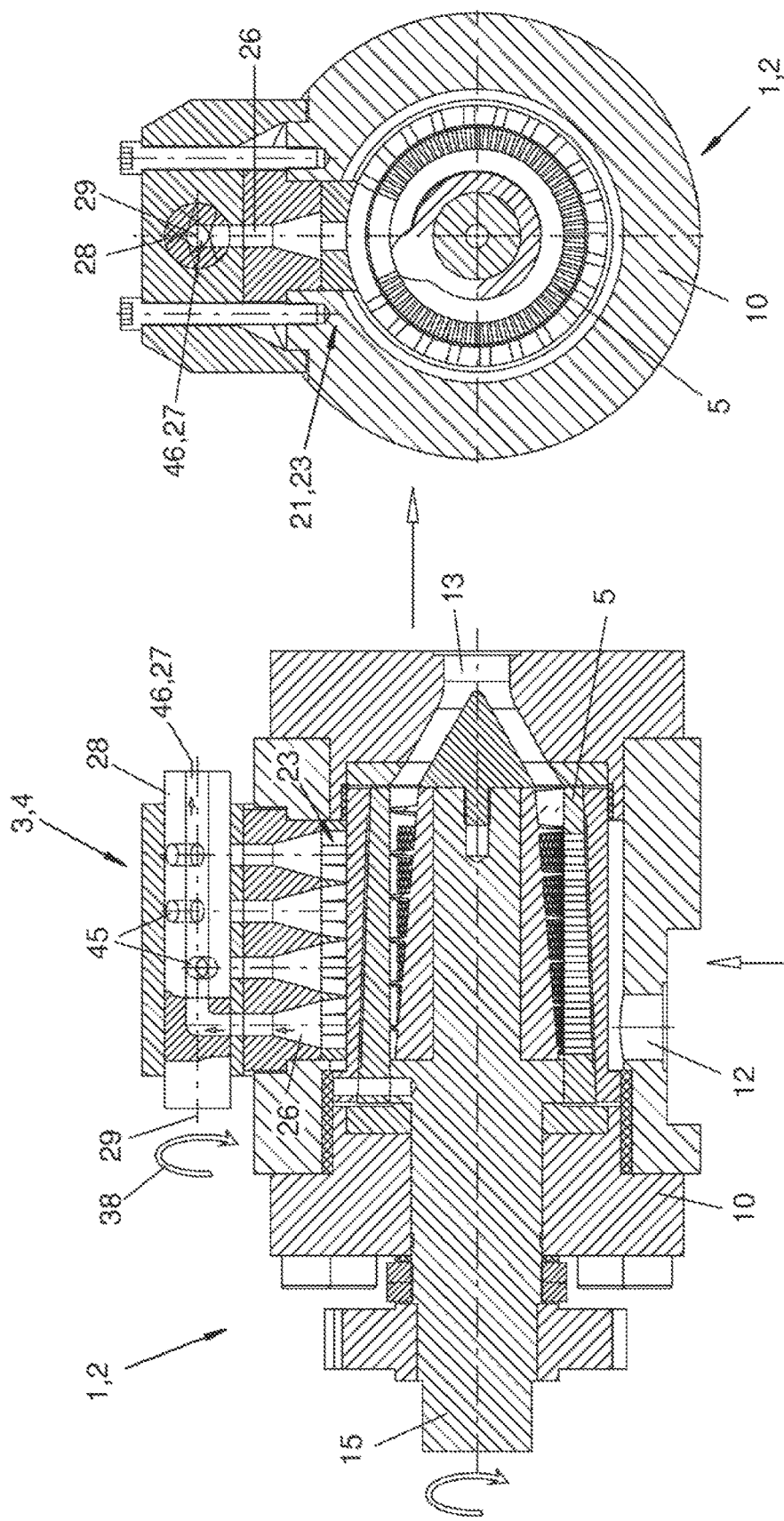

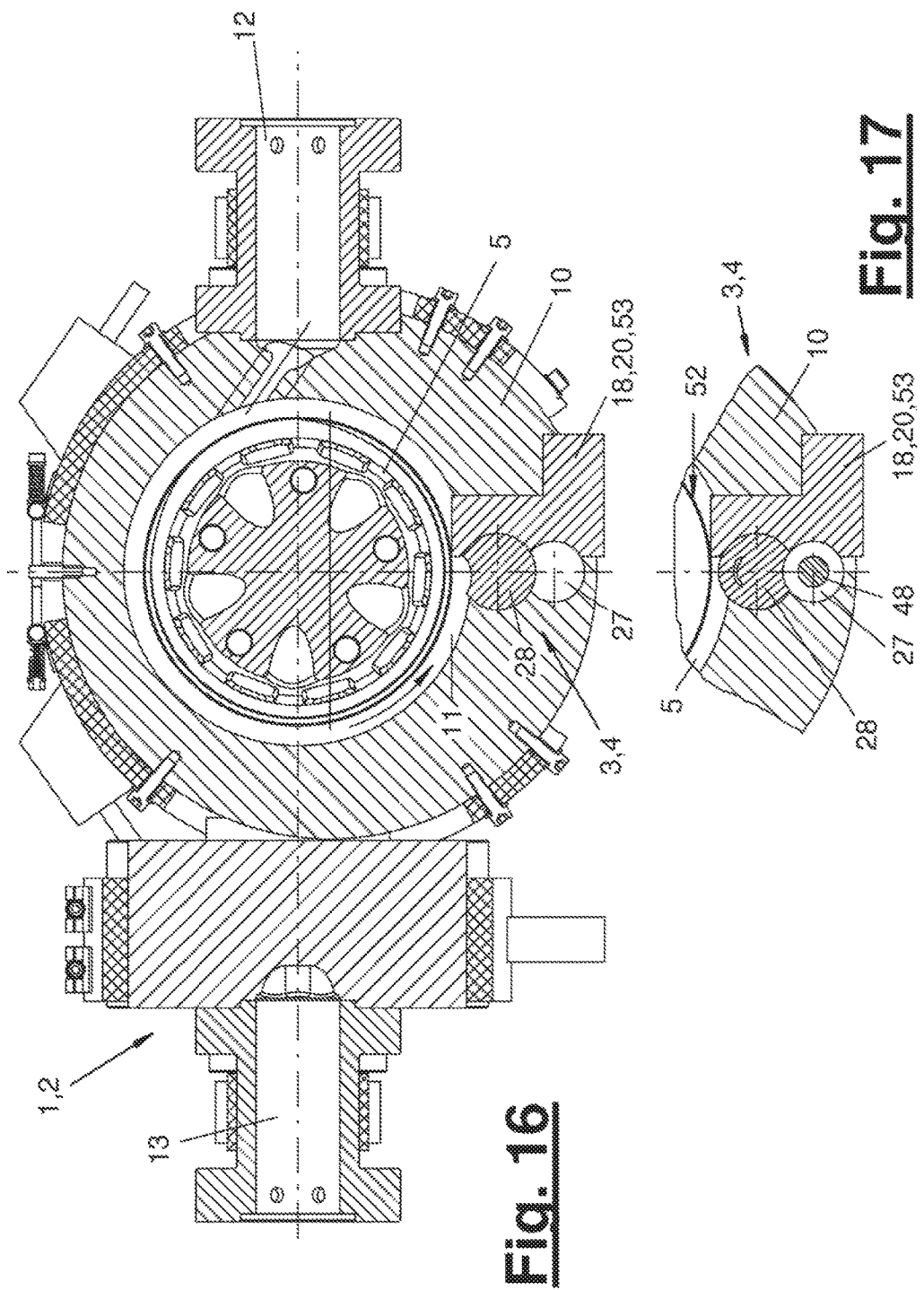

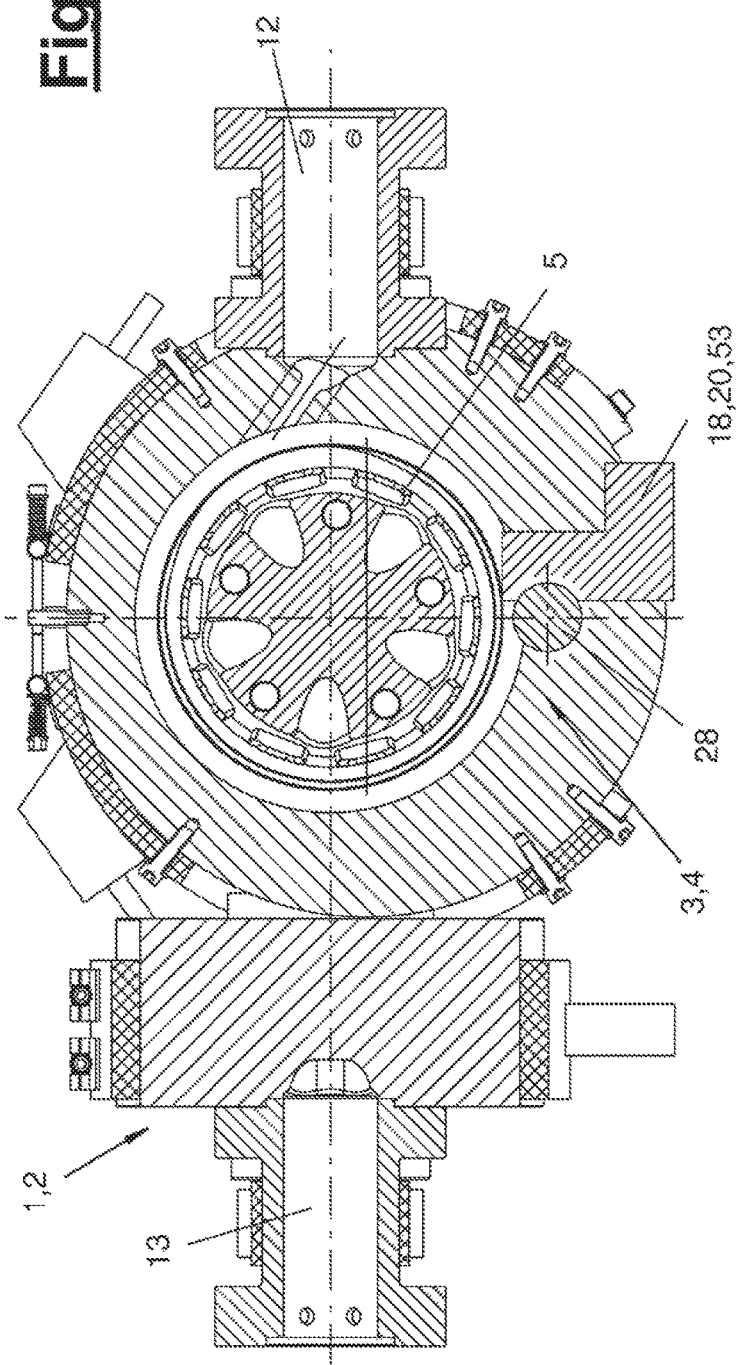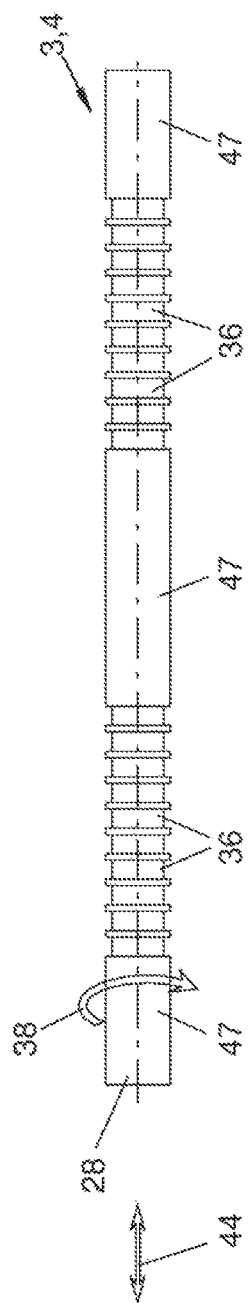

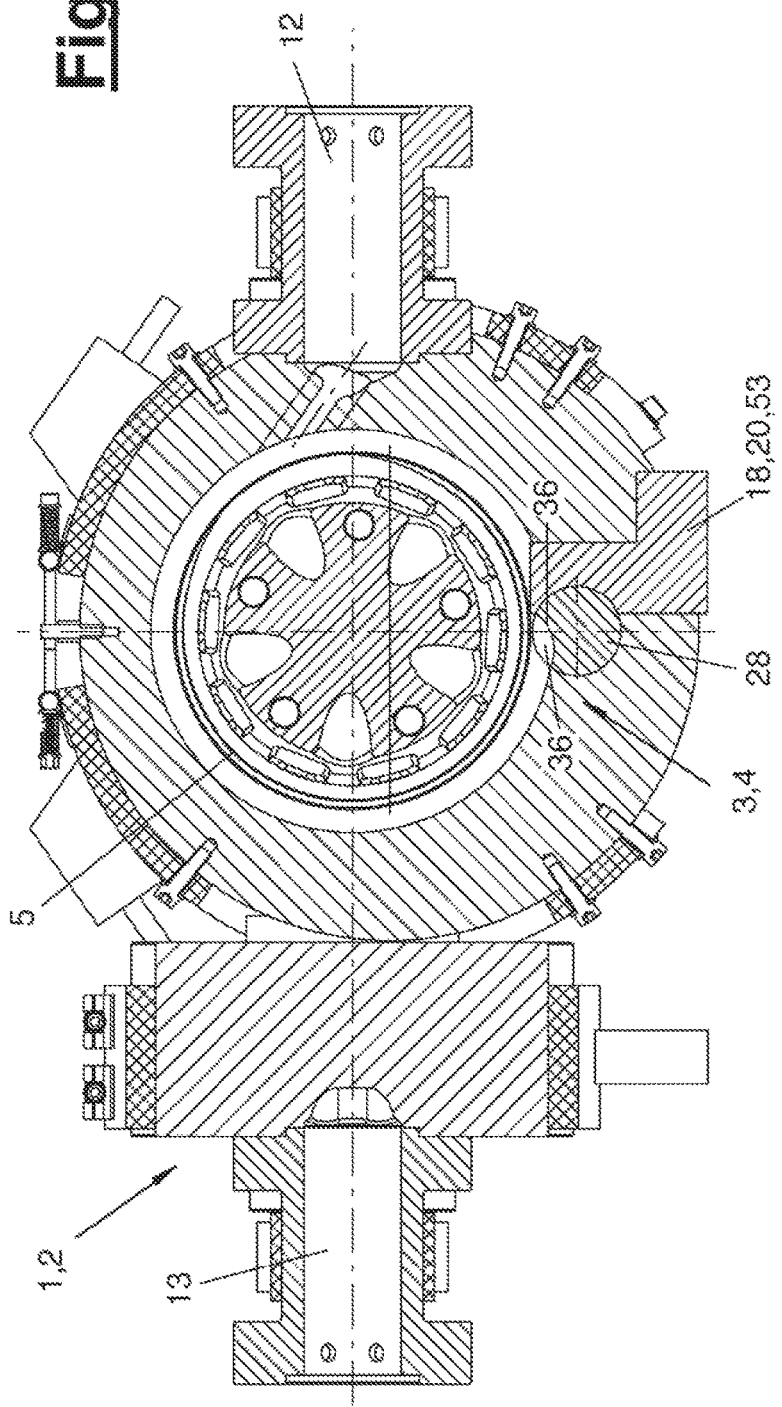

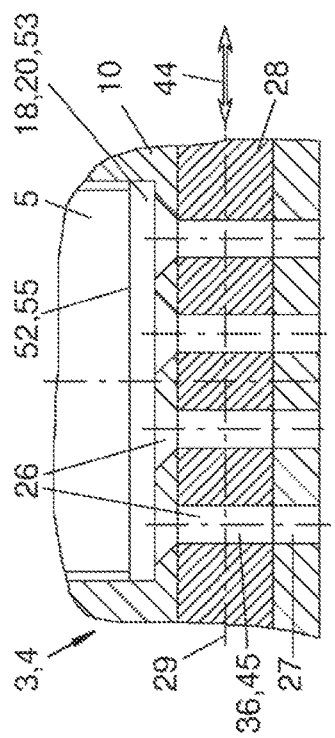
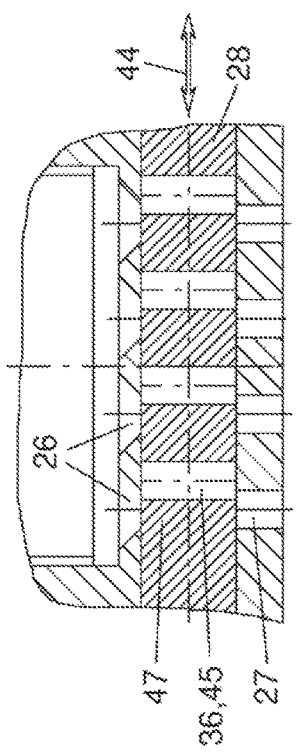
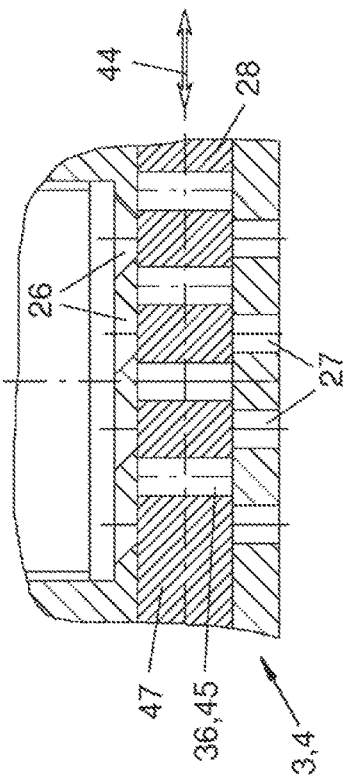
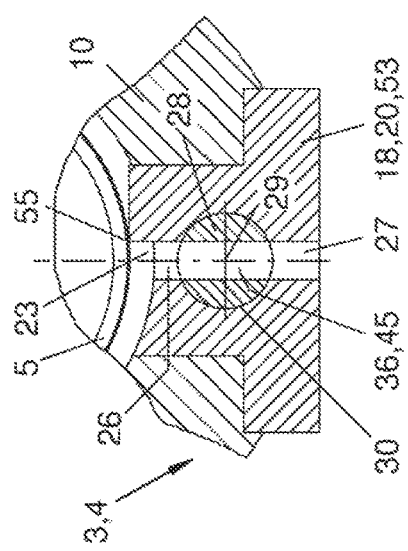

DISCHARGE DEVICE AND DISCHARGE METHOD

CROSS REFERENCE TO RELATED APPLICATIONS

This application is a United States National Phase Application of International Application PCT/EP2014/062877 filed Jun. 18, 2014 and claims the benefit of priority under 35 U.S.C. § 119 of German Patent Application 20 2013 102 619.0 filed Jun. 18, 2013 and 20 2013 103 371.5 filed Jul. 25, 2013 the entire contents of which are incorporated herein by reference.

FIELD OF THE INVENTION

The present invention pertains to a discharge device for a cleaning device for filters and a discharge method with a filter and a cleaning device for this, the cleaning device having a separating device for filter residues from the filter and a collection area as well as a discharge device connected there by means of a feed line for the separated filter residues.

BACKGROUND OF THE INVENTION

Filtering devices with a cleaning device and a discharge device, in which the cleaning device has a backwash device for separating the filter residues, are known from practice. The discharge device is connected here to the cleaning device by means of a feed line at a collection area for the separated filter residues. The discharge takes place under the acting fluid pressure from the filter chamber. Valves, needles or other blocking elements, which can be displaced in a controlled manner, are provided for control.

SUMMARY OF THE INVENTION

An object of the present invention is to provide an improved discharge technique.

This object is accomplished by the present invention. The discharge technique, i.e., the discharge device and discharge method, have the advantage that the discharged quantity of material can be controlled and metered better and more accurately. Leakage losses and excessive discharge of already filtered material can especially be avoided.

The discharge technique claimed can be combined with any cleaning devices and filtering devices. This may take place by way of the original equipment, but also by means of a retrofit. In particular, discharge devices present in existing filtering devices or optionally also cleaning devices together with discharge devices can be replaced or exchanged.

The discharge technique claimed has major advantages in terms of operating safety, availability, low design effort and high efficiency. The cleaning and discharge of separated filter residues can take place in the process during a continuous or intermittent filtering. They can, as an alternative, also take place in a waiting area outside of the actual filtering process, and the filter or filters is/are optionally changed, especially displaced for avoiding interruptions in operation.

A special advantage of the discharge technique claimed is the possibility of an isolation against the external environment. The metering device can act as a blocking and sealing element. Here, the access from the outside to the filtering and processing space can be sealed and closed. The metering device and the blocking and sealing element can have a limited receiving capacity. In this regard, it can only receive the portions of material received at one location and subsequently discharge same at a different location. The access from the outside to the filtering and processing space can be sealed and closed in the area between said locations. This has especially advantages in terms of avoiding a contamination or oxidation of the fluid to be filtered in the filtering device.

The discharge of material can take place selectively in a stream or in portions. Portions of material can, in particular, be received at one location and then discharged at a different location.

The discharge and metering technique claimed is flexible in application and is able to interact with different techniques for separating the filter residues, e.g., backwashing or mechanically separating, and with different filters, in particular tubular filters and disk filters. The metering device and the separating device can, in addition, be combined into a structural and functional unit.

The discharge technique claimed is suitable for all types of materials to be filtered, and in particular fluids. There are special advantages in case of plastic melts, which may be mixed with impurities, e.g., foreign bodies, clumps or the like. This may be the case especially in plastic melts from waste materials. Otherwise, the fluid to be filtered may be another liquid or paste-like mass.

The discharge technique can be used continuously or intermittently. This can be controlled via the metering device. A cleaning of the filter and a discharge of the filter residues can consequently take place as needed and depending on the type of fluid.

The metering device can advantageously be controllable and adaptable to different fluids and to the operating needs. A control is possible by means of a suitably controllable rotary drive, on the one hand, with regard to the rotation of the rotating body and the speed thereof. This can be provided separately and controlled or regulated separately. As an alternative, it can also be derived from other drives that are present, e.g., from the cleaning device and/or the filtering device. The rotary drive can, in addition, be coordinated with a rotary drive for the filter.

Further, the discharge volume can be controlled via the size of the discharged portions of material and the receiving pockets provided for this at the rotating body and optionally be regulated via a corresponding sensor mechanism at the outlet of the discharge device.

An actuator, which may be configured and controlled in different ways, can be present at the rotating body for the discharge of the portions of material. The filling of the receiving pockets can take place in all variants by means of the pressure of material out of the processing space or filtering space. The discharging and emptying of the receiving pocket can take place by means of a movable plunger in the manner of a piston. This plunger can be driven, on the one hand, in case of a corresponding design, by mean of the pressure of material out of the processing or filtering space, so that an opposite receiving pocket is emptied at the same time during the filling of a receiving pocket.

In another variant, a plunger can be actuated, especially pushed out in a controlled manner by a drive element. Furthermore, it is possible to generate the change in volume of the receiving pocket in any other way with a corresponding actuator, which, e.g., contracts flexible pocket walls and consequently drives out the portions of material contained therein. This may be a technique similar to inkjet printers or the like. The stroke control of the drive element can be coordinated with the controllable rotary drive of the metering device and optionally also of the filter.

The metering device can have a multiple arrangement of receiving pockets and actuators, which are optionally offset in relation to one another in the direction of rotation. This can make the discharge of material uniform and possibly reduce or eliminate undesired fluctuations in the system.

The transport and discharge of separated filter residues can be driven via the fluid pressure of the material existing in the filtering device and the cleaning device. This can be, e.g., the fluid pressure (P) in the processing space or the dynamic pressure of the separated filter residues at a mechanical separator. An additional delivery device, e.g., a slide for the transport to the metering device, may be unnecessary.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a sectional view of an embodiment of the metering device in one of various operating positions;

FIG. 7 is a sectional view of an embodiment of the metering device in another of various operating positions;

FIG. 8 is a sectional view of an embodiment of the metering device in another of various operating positions;

FIG. 9 is a metering device with an adjusting device in longitudinal sectional view;

FIG. 10 is a broken-away and enlarged view of a detail X from FIG. 9;

FIG. 11 is a longitudinal sectional view showing another variant of a filtering device with a cleaning device, a discharge device and a metering device;

FIG. 12 is a cross sectional view showing another variant of a filtering device with a cleaning device, a discharge device and a metering device;

FIG. 14 is a longitudinal sectional view showing a first modification of the arrangement from FIG. 11;

FIG. 15 is a cross sectional view showing the first modification of the arrangement from FIG. 11;

FIG. 16 is a cross sectional view of a second modification of the arrangement from FIG. 11 of the metering device;

FIG. 17 is a broken-away detail view of a second modification of the arrangement from FIG. 11 of the metering device in another operating position;

FIG. 21 is a cross sectional view of a third modification of the arrangement from FIG. 11 with a metering element shown in detail;

FIG. 22 is a detail view of the metering element of the third modification of the arrangement from FIG. 11;

FIG. 23 is a cross sectional view of a forth modification of the arrangement from FIG. 11 with a metering element shown in detail;

FIG. 24 is a detail view of the metering element of the forth modification of the arrangement from FIG. 11;

FIG. 25 is a sectional view showing another modification of a metering device with a scraper and a displaceable metering element;

FIG. 26a is a sectional view showing the modification of a metering device with a scraper and a displaceable metering element of FIG. 25 in one of several positions;

FIG. 26b is a sectional view showing the modification of a metering device with a scraper and a displaceable metering element of FIG. 25 in another of several positions;

FIG. 26c is a sectional view showing the modification of a metering device with a scraper and a displaceable metering element of FIG. 25 in another of several positions;

DESCRIPTION OF THE PREFERRED EMBODIMENTS

Figure 1:
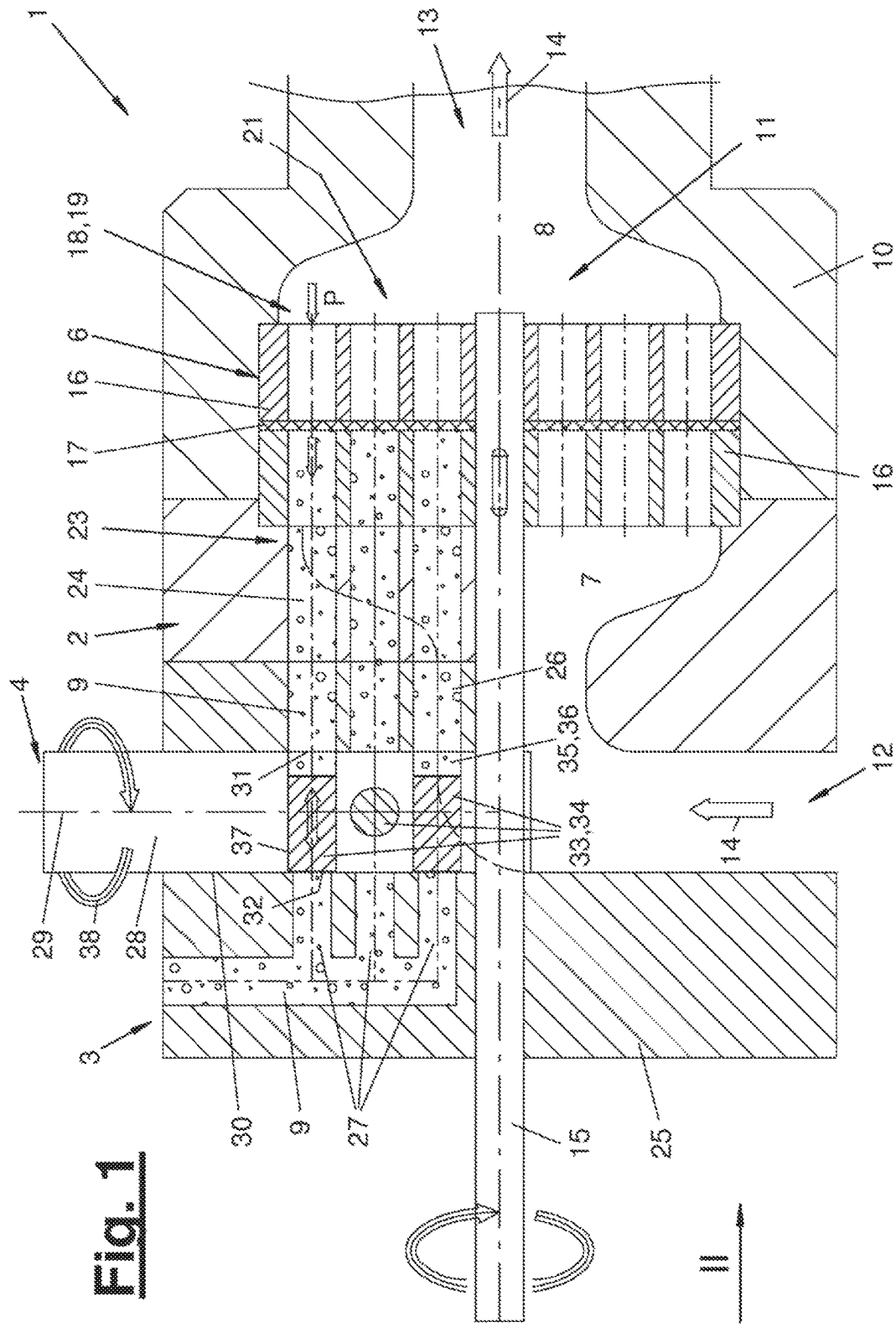
FIG. 1 is a longitudinal sectional view through a first variant of a filtering device with a cleaning device and a discharge device.

The present invention pertains to a discharge device (3) and a discharge method for filter residues (9). The present invention pertains, further, to a cleaning device (2) equipped therewith together with a cleaning method and a filtering device (1) equipped therewith and a filtering method. The present invention pertains, further, to a special embodiment of a metering device (4) and a metering method.

Figure 2:
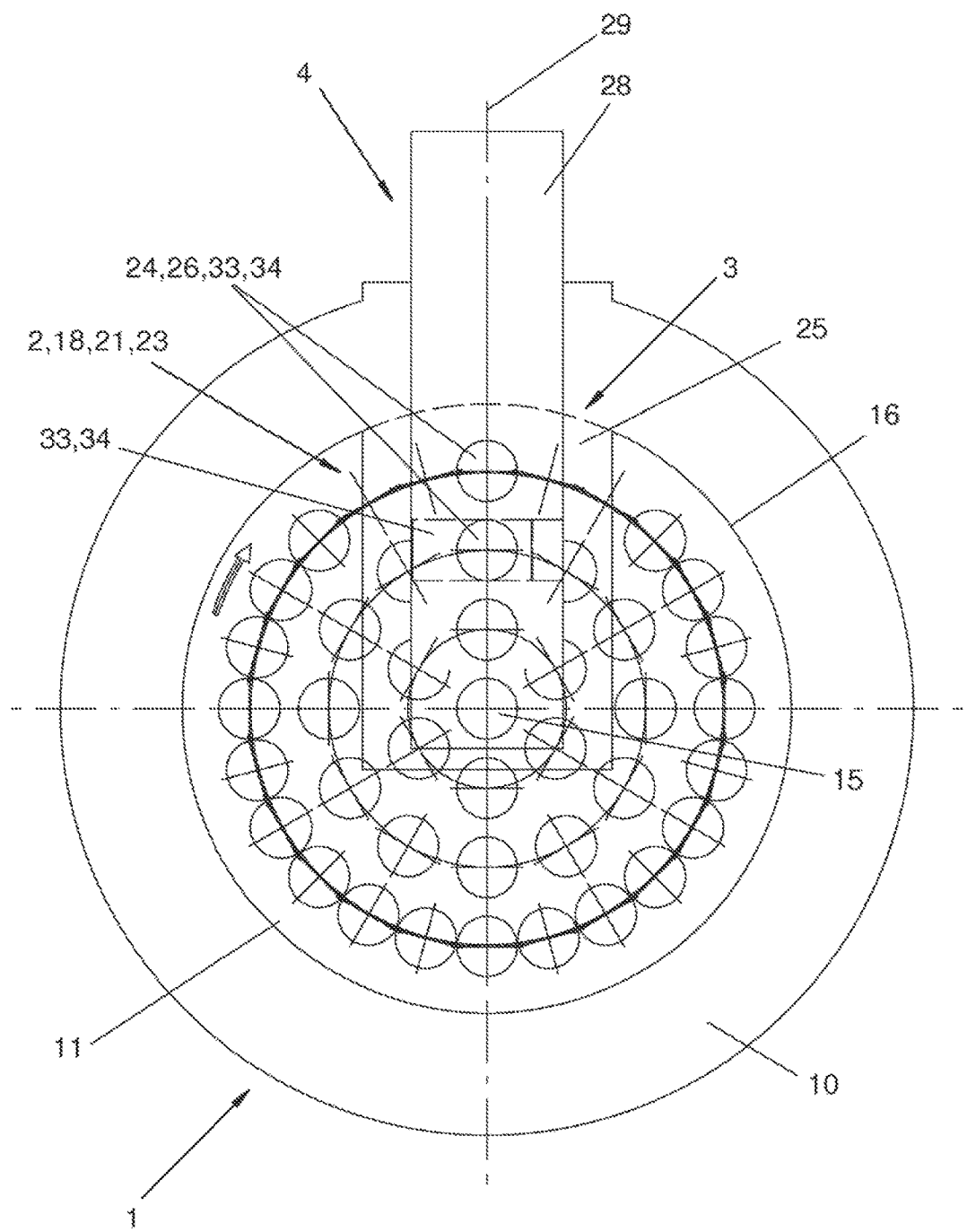
FIG. 2 is a front view of the arrangement according to arrow II of FIG. 1.

FIG. 1 shows a first variant of a filtering device (1) with a cleaning device (2) and a discharge device (3) with a metering device (4) in a longitudinal section. FIG. 2 shows the corresponding front view according to arrow II in FIG. 1. The cleaning device (2) and the discharge device (3) with the metering device (4) can be integral components of the filtering device (1). They may, as an alternative, be independent and attachable devices, which may optionally also be retrofitted. The design also applies to the other variants described below.

The filtering device (1) is used for filtering fluids (7), which are preferably flowable, e.g., liquid or plastic masses. The unfiltered fluid (7) may be mixed with solids, which may be foreign bodies, e.g., metal particles, or clumps or the like. The unfiltered fluid (7) may consist of any suitable material. In the exemplary embodiments shown, it is a molten plastic material, which is fed, e.g., by an extruder (not shown). The filtering device (1) may have a heating device (not shown) for heating the fluid.

The unfiltered fluid (7) is fed via a feed unit (12) under pressure into a filter chamber (11), in which a filter (5, 6) is located. The fluid (8), which is filtered after passing through the filter (5, 6), is then passed on via an optionally contracted discharge unit (13) in the filtering device (1), or discharged from same. Arrows (14) designate the direction of flow. In the filter chamber (11), a fluid pressure (P) prevails in the fluids (7, 8). The above-mentioned embodiments of the filtering device (1) may be the same in the other exemplary embodiments.

The filter (6) may be configured in various ways, e.g., as a disk filter or as a tubular filter. The exemplary embodiments described below indicate various variants for this.

The filter (6) is configured as a disk filter in the exemplary embodiment of FIGS. 1 and 2. It can be mounted rotatably about an axis (15) and can rotate about this axis during the filtering process and during the passage of fluid. The axis (15) can have a controllable rotary drive (not shown). The rotation and filtering can take place continuously. The speed of rotation can be adapted to different fluids (7, 8) and different operating needs, e.g., varying quantities of fluid, pressures, temperatures, solids loads, etc.

The disk filter (6) comprises a filter carrier (16) which is formed by two perforated supporting disks in FIG. 1. The supporting disks clamp between them a filter element (17), through which the fluid (7) flows into the perforated areas (7). The filter element (17) may be configured, e.g., as a perforated disk screen, as a textile filter disk or the like. The filter carrier (16) and the filter element (17) are pulled up on the axis or shaft (15) and held at the end. They are guided in the housing (10) in suitable recesses on the circumference or other guiding elements.

The cleaning device (2) is used for separating filter residues (9), which are deposited in the course of the filtering process on the contaminated side of the filter element (17) or the filter surface (52). These may be the above-mentioned impurities or the like. The cleaning device (2) has a separating device (18), which may have different designs, for the filter residues (9). The separating device (18) is configured as a backwash device (19) in the exemplary embodiment of FIG. 1. In this case, the filter residues (9) are separated with the fluid pressure (P) acting on the clean side of the filter (5, 6).

In the embodiment of FIG. 1 shown, the cleaning device (2) can operate preferably continuously, and, as an alternative, intermittently during the filtering process. In this connection, it is associated with the filter chamber (11) and the processing space and has there a cleaning area (21), through which the rotating filter (5, 6) is, e.g., moved permanently.

A collection area (23) for the separated filter residues (9) is located on the cleaning side of the filter (5, 6), especially of the filter element (17). This collection area (23) can be located within the filter chamber (11) and be sealed against same in a suitable manner. The seal prevents the discharge of the separated filter residues (9) in the area of the fluid (7) to be filtered.

The collection area (23) tightly adjoins the filter (5, 6) on one side, especially the facing perforated supporting disk of the filter carrier (16). On the other discharge side the collection area (23) adjoins the discharge device (3). The collection area (23) can be a one-part space, enclosed by the seal. In the exemplary embodiment shown, the collection area (23) is divided into a plurality of parallel collection channels (24). The distribution thereof may agree with the perforation distribution of the supporting disks and the filter carrier (16). The cleaning device (2) and the collection area (23) are arranged in a stationary manner in the exemplary embodiment shown. During the rotation of the filter, the supporting disk perforations and the collection channels (24) are consequently always covered, so that a flowing of the separated filter residues (9) is possible.

The discharge device (3) is arranged in direct connection with the cleaning device (2) and has one or more feed lines (26), which are arranged and aligned corresponding to the collection area (23) or the collection channels (24) and adjoin same in a flush manner for a flow connection.

A direct connection is present in the exemplary embodiment of FIG. 1 being shown. In another embodiment, the discharge device (3) can be arranged locally separated and at a distance from the cleaning device (2) as well as the filtering device (1), and a bridging or extension line is present for connection with the collection area (23) and the collection channels (24). The discharge device (3) is arranged in a stationary manner in the embodiment of FIGS. 1 and 2 shown and in the above-mentioned variants and mounted, e.g., at the filter housing (10).

The discharge device (3) has a controllable metering device (4) in connection with the one or more feed lines (26). The metering device (4) closes the feed line(s) (26) in the outflow direction and prevents an undesired discharge of filter residues (9). On the other hand, the metering device (4) is configured in such a way that it receives the separated filter residues (9) in portions (35) from the feed line or feed lines (26) and then discharges same to a different, locally separated location. For this, one or more discharge lines (27) are arranged in the housing (25) of the discharge device (3), which receive the portions of material (35) of the filter residues (9), optionally bring them together in a collection channel and then move them out of the discharge device (3). The one or more feed lines and discharge lines (26, 27) present may be present in a corresponding number and arrangement.

The metering device (4) is arranged between the feed line or feed lines (26) and the discharge line or discharge lines (27) in the housing (25).

The metering device (4) has a movable metering element (28). The metering element (28) may be arranged, e.g., in a rotatable and/or displaceable manner and brings about the metering in portions (35). In other exemplary embodiments explained below, the metering device (4) may selectively receive the separated filter residues in a stream from the feed line or feed lines (26) and then discharge same to a different, locally separated location.

In the exemplary embodiment of FIG. 1, the metering device (4) has a metering element (28) in the form of a rotating body (28) rotating about an axis (29), which is configured, e.g., as a cylindrical shaft or roll. The rotating body (28) can have a controllable rotary drive (38), which is symbolized by an arrow. The rotary drive (38) can be coordinated with the rotary drive and with the optionally variable speed of rotation of the filter (5, 6).

The rotating body (28) has on its outer side one or more receiving pockets (36), which are variable in their volume and which are used for receiving and discharging a said portion (35) of material. The number and arrangement of the receiving pockets (36) may depend on the number and on the arrangement of the feed lines (26).

The rotating body (28) is otherwise tightly enclosed by the wall (30) of the housing (25) with the exception of the connection points of the feed line(s) (26) and discharge line(s) (27). Consequently, it blocks the direct flow between the feed line and discharge line or feed lines and discharge lines (26, 27). Consequently, it also prevents the passage of external environmental effects from the discharge line or discharge lines (27) into the collection area (23) and further into the filter chamber (11).

The rotating body (28) has an actuator (33), which decreases and increases the pocket volume of the receiving pocket(s) (36) as needed and preferably in a controlled manner. In case of an increase, a portion (35) of material is received and then discharged in case of a decrease. The feed of a portion of material from a feed line (26) can take place due to the fluid pressure (P), when, according to FIG. 1, the receiving pocket (36) is flush with the feed line (26), the collection channel (24) and the perforation on the supporting disk of the filter carrier (16), forming a flow channel. The feed and discharge lines (26, 27) are aligned, e.g., radially to the axis of rotation (29) and are arranged diametrically opposite.

In the variant of FIG. 1, the actuator (33) has a movable plunger (34), which forms the bottom of the receiving pocket (36). The actuator (33) has in this connection a receiving channel (37), which is aligned transversely to the axis of rotation (29), in the rotating body (28), in which the plunger (34) is arranged in a longitudinally displaceable manner. The plunger length is shorter in this case than the channel length. The receiving channel (37) is aligned radially at the rotating body (28) and intersects the central axis of rotation (29) in the embodiment shown.

As an alternative, the receiving channel (37) may be arranged offset to the axis (29) in the manner of a secant. A plurality of such offset receiving channels can also be present in a parallel arrangement, and the feed and discharge lines (26, 27) are arranged in a correspondingly multiple number. The receiving channel (37) can, further, have a bent or angular shape instead of the straight alignment shown, and a channel section can also run along or transversely to the axis of rotation (29).

In the embodiment shown, the receiving channel (37) is configured as a continuous channel, which traverses the rotating body (28) transversely to the axis (29) and has mouth openings (26, 27) at both ends at the rotating body jacket. The feed and discharge line(s) (26, 27) are arranged in relation to one another and to the receiving and continuous channels in such a way that they are covered at the same time at least in one rotation position of the rotating body (28) with both mouth openings (31, 32). FIG. 1 shows this with the lengthwise-cut plungers (34).

The rotating body (28), in particular a shaft, can have a plurality of actuators (33) and a plurality of receiving pockets (36). According to FIG. 1, a plurality of actuators (33) and a plurality of receiving pockets (36) are in this case arranged behind one another along the axis of rotation (29). The plurality of actuators (33) and the plurality of receiving pockets (36) can have here an identical or mutually different angular alignment in relation to the axis of rotation (29).

The plungers (34) and the linear receiving channels (37) have a mutually adapted cross-sectional shape, which has a, e.g., circular design. In the receiving or flow channel (37), the plunger (34) blocks the direct flow of the portion (35) of material between the mouth openings (31, 32).

FIGS. 6 through 8 illustrate the mode of action of the metering device (4) shown in FIGS. 1 and 2. When the mouth or inlet opening (31) is covered with a feed line (26) according to FIG. 6, a portion (35) of material is pushed forwards by means of the fluid pressure (P) in the direction of flow illustrated by an arrow. This portion pushes the plunger (34), which is held, e.g., in a freely movable manner in the axial direction, back into the receiving channel (37) and consequently forms the receiving pocket (36). The plunger movement is limited in a suitable manner, e.g., by means of an internal stop pin or the like, so that the other plunger front side correlates with the mouth opening (32). The front sides of the plunger (34), which is configured, e.g., as a cylindrical pin, can have a roundness corresponding to the outer contour of the rotating body (28).

In the further path of rotation according to FIG. 7, the receiving pocket (36) is closed by means of the housing wall (30) and the portion (35) of material is prevented from being discharged. After a rotation by 180°, the mouth openings (31, 32) are again flush with the corresponding feed line and discharge line (26, 27). The material pressure present on the feed side presses against the rear front side of the plunger (34) and displaces the plunger in the arrow direction, as a result of which a new receiving pocket (36) is formed, and the portion (35) of material is pushed out of the previous receiving pocket (36) into the discharge line (27) at the same time on the opposite side. The above-described metering process then begins anew.

In case of a multiple arrangement and an angular offset of actuators (33), in particular in the crossed alignment shown, these actuators act in a manner offset in time, as a result of which the metering and the discharge of material in portions are made uniform.

Figure 3:
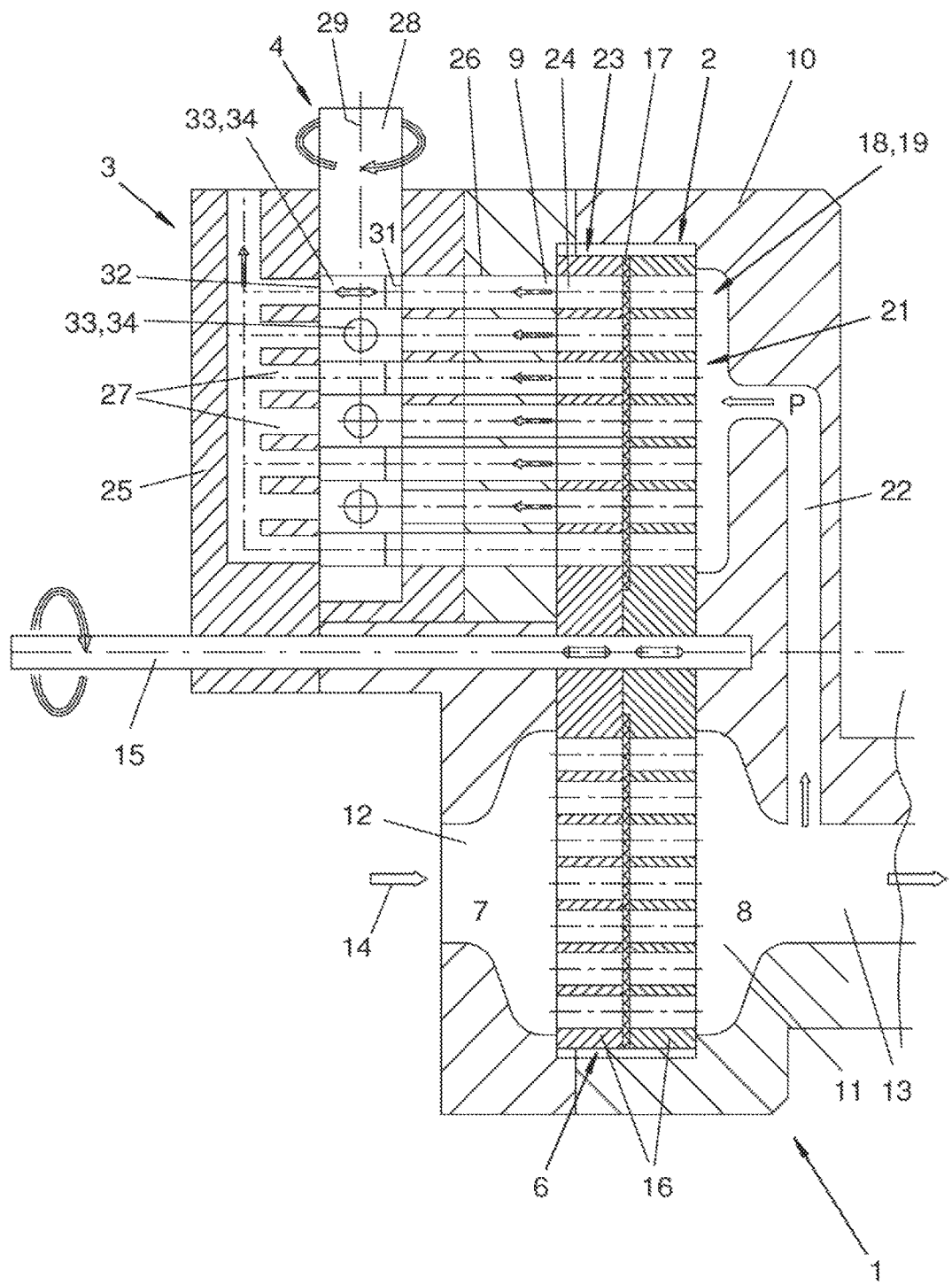
FIG. 3 is a longitudinal sectional view through another variant of a filtering device, cleaning device and discharge device.

FIG. 3 shows a variant of the filtering device (1) and the cleaning device (2), which are largely in agreement with the first exemplary embodiment of FIGS. 1 and 2. There are differences in the embodiment of the filter (6) and the separation in space of the cleaning area (21) from one or more filter chambers (11). At least one filter chamber (11) is connected here via a recirculating channel (22) to the cleaning area (21) in a fluidic manner and for conducting the fluid pressure (P).

In this exemplary embodiment, the disk filter (6) likewise has a filter carrier (16) formed from, e.g., two parallel, perforated supporting disks, with at least one filter element (17) arranged between them. The perforated arrangement on the supporting disks and the filter element (17) may have a ring-shaped design and can be concentric to the axis (15). In another embodiment, the filter (6) may be segmented, and the supporting disks has a plurality of perforated areas distributed uniformly around the axis (15) and separated from one another by massive wall sections. The filter element (17) can accordingly be divided into a plurality of segments adapted to the perforated areas and distributed in a corresponding manner.

The filtering device (1) can have a plurality of filter chambers (11) arranged distributed about the axis (15) and a cleaning area (21) located at a spatial distance herefrom and connected via at least one recirculating channel (22).

The separating device (18) of the cleaning device (2) is again configured as a backwash device (19) and is arranged in a stationary manner. On the contamination side, it also has the mentioned collection area (23), which is divided here into a larger number of collection channels (24) than in the first exemplary embodiment. The number of feed lines and discharge lines (26, 27) of the discharge device (3) is correspondingly changed and adapted. The same applies to the number and arrangement of the receiving pockets (36) and of the actuators (33) at the rotating body (28). The operation is otherwise the same as in the first exemplary embodiment.

Figure 4:
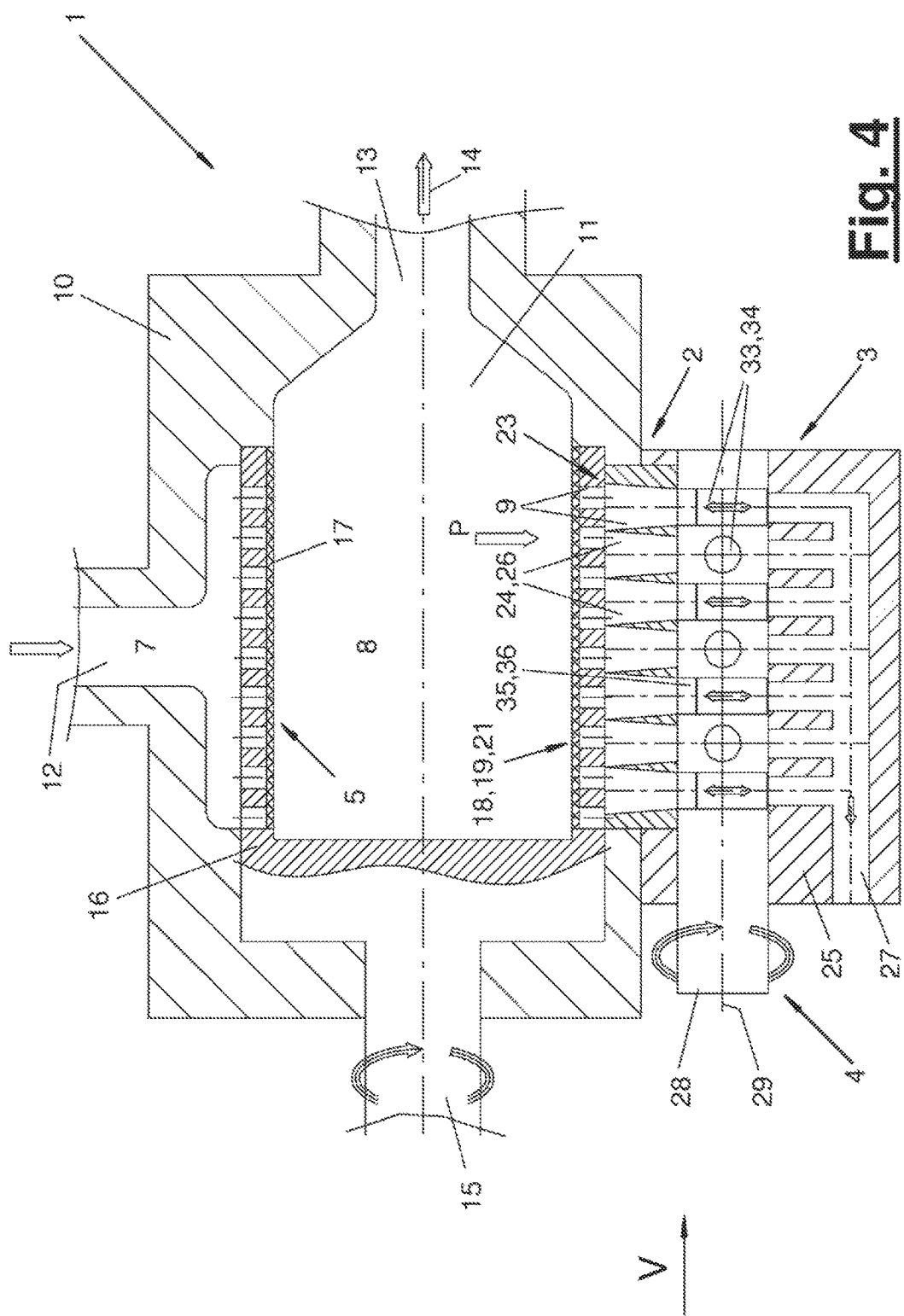
FIG. 4 is a longitudinal sectional view through a third variant of a filtering device with cleaning device and discharge device.
Figure 5:
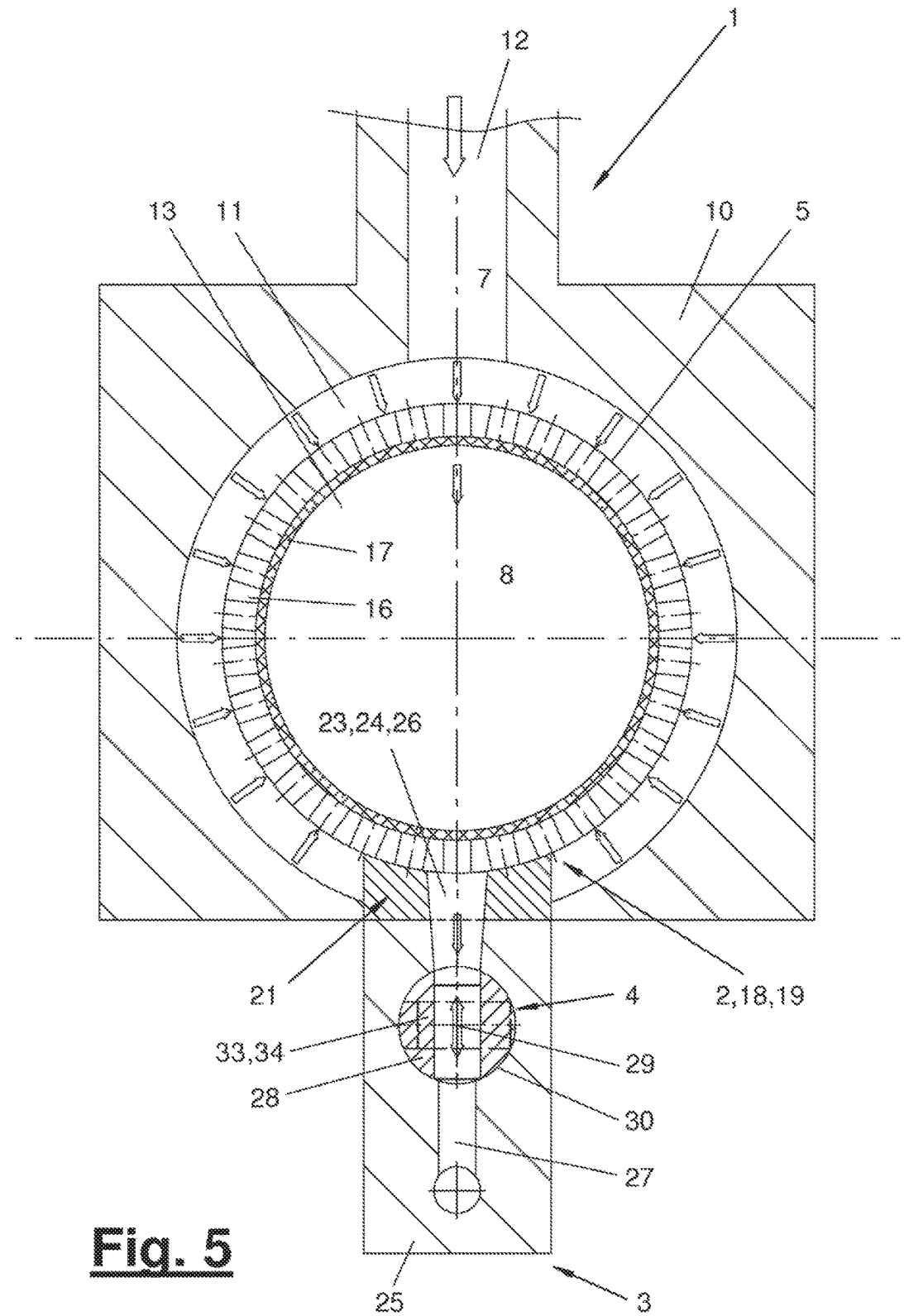
FIG. 5 is a front view of the arrangement according to arrow V in FIG. 4.

FIGS. 4 and 5 show another variant of the filtering device (1) and the cleaning device (2), in which a filter (5) is used in the form of a tubular filter. In the exemplary embodiment shown, unfiltered fluid (7) passes through this filter from the outside from a ring chamber inwards, and the filter residues (9) are discharged radially outwards in the cleaning area (21).

The tubular filter (5), which is in turn mounted rotatably about an axis (15), has a filter carrier (16) in the form of a cylinder open on a front side with a perforated jacket and a support together with a pin arrangement on the other front side. The filter element (17) is arranged, e.g., on the inner side of the perforated cylinder (16) and has a ring shape. It can be configured, e.g., as a ring cartridge comprising a perforated screen belt.

The collection area (23) is again divided into a plurality of collection channels (24), which have a radial alignment here in contrast to the axial alignment of the first two variants. FIGS. 4 and 5 also show here the possibility of putting together the collection channels (24) and the feed lines (26), the discharge device (3) being correspondingly integrated into the housing (10) of the filtering device (1). The discharge device (3) and the metering device (4) have otherwise the same basic design as in the above-mentioned exemplary embodiment, where, with a corresponding filter shape, the alignment and arrangement at the filter housing (10) are changed. The axes (15, 29) are aligned parallel to one another in this exemplary embodiment. They have a crossed arrangement in the first two embodiments.

The metering device (4) may be configured as a controllable metering device. There are various possibilities for this. On the one hand, the rotary movement and speed of rotation of the metering element (28) and of the rotating body can be controlled by means of a rotary drive (38). On the other hand, the size of the receiving pocket (35) may optionally be controlled, e.g., via the plunger stroke. Here, the control can take place in coordination with the rotation of the filter. In a further embodiment, a regulation can also be present in conjunction with a corresponding sensor mechanism.

FIGS. 9 and 10 illustrate a variant of a metering device (4), in which the actuator (33) has an adjusting device (39) for changing the plunger stroke. The adjusting device (39) has for this an axially movable adjusting element (40), which is configured, e.g., as an adjusting rod and which extends along and preferably flush with the axis of rotation (29). The adjusting element can be moved back and forth in the axial direction in a controlled manner by a drive (not shown).

The one or more plungers (34) have a corresponding adjusting element (41), which is configured, e.g., as an adjusting opening, which encloses the adjusting rod (40) at least in some areas with an excess corresponding to the plunger stroke. The adjusting elements (40, 41) can have a circular cross section. The adjusting opening (41) may also be configured as an elongated hole and the adjusting rod (40) in the opening area as a flat bar.

The adjusting elements (40, 41) have adjusting surfaces (42, 43), which are coordinated with one another and interact and which determine the plunger stroke depending on the axial position of the adjusting rod (40). The adjusting surfaces (42, 43) are configured, e.g., as wedge surfaces limited on the circumference or as continuous cones. The oblique adjusting surfaces (42, 43) can only be present in some places in the axial direction in the plunger area and have a mutually adapted slope against the axis of rotation (29). The adjusting element (40) can optionally axially traverse a plurality of plungers (34) and can have a plurality of adjusting surfaces (42) corresponding to the number of plungers.

FIG. 10 illustrates the mode of action in an enlarged view. The initial position shown in FIG. 9 is shown in dotted line here. In the initial position of the adjusting rod (40), the plungers (34) can approach the axis of rotation (29) in a maximal manner to form the respective receiving pocket (36) and have a maximum stroke as a result of this. The adjusting opening (41) has an opening width which is measured against the adjusting rod (40) corresponding to the desired plunger stroke. With maximum stroke and maximum pocket size, the front sides of the plungers (34), which oppose one another, line up precisely with the mouth opening (32).

If according to FIG. 10 the adjusting rod (40) is moved a bit axially forwards, so that the adjusting surfaces (42) penetrate deeper into the respective adjusting opening (41), the stroke travel of the plungers (34) is limited by earlier stopping of the adjusting surface or wedge surface (42, 43). The adjusting rod (40) can be moved in stages or continuously for changing the plunger stroke.

In a further embodiment, not shown, the receiving channel (37) may be configured as a blind channel open on one side, and the actuator (33) has a drive means acting on the plunger (34), which drive means is controlled as a function of the rotation position of the rotating body (28) about the axis (29) and corresponding to the arrangement of the lines (26, 27). The feed and discharge lines (26, 27) may have a non-flush alignment in this variant. In addition, a plurality of such lines (26, 27) can be arranged distributed on the circumference of the rotating body (28) and of the actuator (33). The drive means generates a force of pressure in a controlled manner and pushes out the plunger (34) together with the portion (35) of material. When the drive means is disconnected from power, the fluid pressure (P) can push back the plunger (34) and form the receiving pocket (36). In a modification of this variant, the actuator (33) or the drive means can replace the plunger and form the pocket bottom itself. FIGS. 31 through 33 and 36, 37 show structural embodiments for this.

In another variant the receiving pocket (36) can be formed by a flexible hollow body, e.g., a bubble, which replaces the plunger and which is acted upon by a drive means to change the volume and is, e.g., contracted or compressed. As a result of this, the portion (35) of material contained therein can be driven out. The design and mode of operation can be similar to inkjet printers.

A drive means may be configured and actuated in any suitable manner. It can be configured, e.g., as a fluidic drive means with transmission of force by means of a pressurized gas or by means of a liquid which pushes out the plunger (34), acting as a piston, with modulation of force about a limited path. Furthermore, it is possible to design the plunger (34) as a flexible bubble, which is arranged in the receiving channel (37) and is filled, as needed, with a fluidic pressurizing agent, and it is expanded as the pocket volume decreases. The supply lines for a fluidic pressurizing agent, leading to the various actuators (33) and drive means, can be installed in the rotating body (28). A plurality of receiving pockets (36) and a plurality of plungers (34), acted upon by the same or different drive means, bubbles or the like, can be present on a circumferential line of the rotating body (28).

In a further modification a drive means can be configured as an electromagnetic expansion agent, e.g., as a piezo element. It can act on a thin, piston-like plunger (34) or form the pocket bottom itself. It can be electrically actuated by a corresponding control unit via a corresponding line arrangement in the rotating body (28).

In a further variant, not shown, a cleaning device (2) can have a separating device (18), which is configured as a mechanical separator (20). The separator (20) can have, e.g., the form of a scraper or lifter. FIGS. 16 through 26 and 29 through 38 show examples of such scrapers or lifters. The discharge device has in this case, e.g., a rotatable worm shaft, which is arranged in the line (26), and at its end is arranged a metering device (4) of the above-described type. The worm shaft can also be dispensed with, and the filter residues lifted off by the scraper are conveyed by fluid pressure from the filter chamber to the metering device (4). In a modified embodiment, a rotating worm shaft or another separating means, which mechanically lifts off the filter residues (9) from the filter element (17) and conducts same to a feed line (26), can also be present instead of a blade-like scraper. Such a worm shaft can be configured, e.g., according to FIGS. 27 and 28. The filter element (17) in this case may likewise have any design and can have especially a disk or tubular shape.

A metering device (4) of the above-described type, especially with an adjusting device (39) and with an alternative design or the actuator or actuators (33) can also be arranged directly at a filter (5, 6). It can in this connection be arranged in the wall of the filter housing (10) and can also protrude with its rotating body into the filter chamber (11) and the cleaning area (21). A feed line (26) can in this case be dispensed with, such that the filter residues (9) lifted off and optionally retained by a mechanical separator (20) are conveyed directly into the receiving pockets (36) of the rotating body (28). In this variant, the metering device (4) can preferably have actuators (33) with angular offset and optionally with the above-described drive means.

In a further modification of the exemplary embodiments of FIGS. 1 through 5, the discharge of the separated filter residues can also take place in a stream, the metering device (4) and the metering element (28) being configured correspondingly differently, e.g., according to FIG. 11, 12 or 25, 26. The transport of the separated filter residues can in this case be driven by the fluid pressure (P).

FIGS. 11 and 12 show the longitudinal section and the cross section of a further modification of a filtering device (1) with a filter (5), a cleaning device (2) and a discharge device (3) with a metering device (4). A plurality of the discharge devices and the metering devices (3, 4) can be arranged and distributed at the filter (5). The cleaning device (2) and the discharge device (3) with the metering device (4) can be integral components of the filtering device (1). They can, as an alternative, be independent and attachable devices, which can optionally also be retrofitted. The embodiment also applies to the other variants described below.

The filter (5) is configured as a tubular filter in the exemplary embodiment of FIGS. 11 and 12. The fluid passes through the filter radially from the outside from a ring chamber inwards. The filter (5) can be mounted rotatably about an axis (15) and can rotate about this axis (15) during a filtering process and during passage of fluid. The axis (15) can have a controllable rotary drive (not shown). The rotation and filtering can take place continuously. The speed of rotation can be adapted to different fluids and different operating needs, e.g., varying quantities of fluid, pressures, temperatures, solids loads, etc.

The tubular filter (5) has a filter carrier (16) in the form of a cylinder open on a front side with a perforated jacket and a support together with pin arrangement on the other front side. The filter element (17) is arranged, e.g., on the inner side of the perforated cylinder (16) and has a ring shape. It can be formed, e.g., as ring cartridge comprising a perforated screen belt.

The cleaning device (2) is used for separating the above-mentioned filter residues and has a separating device (18), which is configured as a backwash device (19) in the exemplary embodiment of FIG. 11. The filter residues are in this case separated with the fluid pressure (P) acting on the cleaning side of the filter (5).

In the embodiment of FIGS. 11 and 12 being shown, the cleaning device (2) can act preferably continuously and, as an alternative, intermittently during the filtering process. It is associated here with the filter chamber (11) and the processing space and has there a cleaning area (21), through which the rotating filter (5) moves, e.g., permanently.

A collection area (23) for the separated filter residues is located on the cleaning side of the filter (5), especially of the filter element (17). The collection area (23) can be located within the filter chamber (11) and be sealed against same in a suitable manner. The seal prevents a discharge of the separated filter residues in the area of the fluid to be filtered.

The collection area (23) tightly adjoins the filter (5) on the one side, especially the facing perforated filter carrier (16). On the other discharge side, the collection area (23) adjoins the discharge device (3). The collection area (23) can be a one-part space that is enclosed by the seal. In the exemplary embodiment shown, the collection area (23) is divided into a plurality of parallel collection channels (24). The distribution thereof can be in agreement with the distribution of holes on the jacket of the filter carrier (16). The cleaning device (2) and the collection area (23) are arranged in a stationary manner in the exemplary embodiment shown. During rotation of the filter, the jacket holes and the collection channels (24) are consequently always covered, such that a flow of the separated filter residues (9) is possible.

The discharge device (3) is arranged in direct connection with the cleaning device (2) and has one or more feed lines (26), which are arranged and aligned corresponding to the collection area (23) and the collection channels (24) and adjoins same in a flush manner for a flow connection.

A direct connection is present in the exemplary embodiment being shown. In another embodiment, the discharge device (3) can be locally separated and arranged at a distance from the cleaning device (2) as well as from the filtering device (1), and a bridging or extension line is present for connecting with the collection area (23) and the collection channels (24). The discharge device (3) is arranged in a stationary manner and is mounted, e.g., on the filter housing (10) in the embodiment of FIGS. 11 and 12 being shown and in the above-mentioned variant.

The discharge device (3) has, in connection with one or more feed lines (26), a metering device (4) with a movable metering element (28). The metering device (4) can block the feed line(s) (26) in the outflow direction and prevent an undesired discharge of filter residues. On the other hand, the metering device (4) is configured such that it receives the separated filter residues selectively in a stream or in portions from the feed line or feed lines (26) and then discharges same to a different, locally separated location. One or more discharge lines (27) are arranged for this in the housing (25), which receive the material stream or the portions of material of the filter residues, optionally guide them together in a collection channel and then conduct them out of the discharge device (3). The one or more feed and discharge lines (26, 27) present may be present in a corresponding number and arrangement.

The metering device (4) is arranged between the feed line or feed lines (26) and the discharge line or discharge lines (27) in the housing (25). The metering device (4) is controllable.

The metering device (4) has a metering element, which is mounted displaceably along a central axis (29) and preferably also parallel to the filter axis (15) and which is configured, e.g., as a cylindrical plunger or as a shaft. As an alternative, the metering element (28) can have a flat bar shape. The metering device (4) can have a controllable drive (44), in particular a slide drive, for the metering element (28), which is symbolized by an arrow. In addition or as an alternative, a rotary drive (38), which is likewise symbolized, can be present. In a further modification, motor drives (38, 44) can be dispensed with and the metering element (28) can be moved manually. The controllable drive (44) can also form a controllable actuator (33) according to the exemplary embodiments of FIGS. 9 and 10.

The metering of discharged material is controlled via the sliding position and/or rotation position of the metering element (28). The drive or drives (44, 38) can be coordinated with the rotary drive or the optionally variable speed of rotation of the filter (5).

The metering element (28) has, on its body, one or more receiving pockets (36), which are configured in this variant as transverse channels (45) traversing the body and open at the end. Their number, size and arrangement can depend on the number, size and arrangement of the feed lines (26) and optionally the discharge lines (27). The lines (26, 27) and the transverse channels (45) preferably have the same alignment. The transverse channels (45), which are axially spaced apart from one another, are separated by massive areas (47) of the metering element (28).

The metering element (28) is otherwise tightly enclosed by the wall (30) of the housing (25) with the exception of the connection points of the feed line(s) (26) and the discharge line(s) (27. It can block, meter and reduce or release the direct flow between the feed line and discharge line or the feed lines and discharge lines (26, 27). In the blocked position, it prevents a passage of external environmental effects from the discharge line or discharge lines (27) into the collection area (23) and further into the filter chamber (11).

FIGS. 13*a*-*d* show the metering device (4) in various operating positions.

Figure 13D:
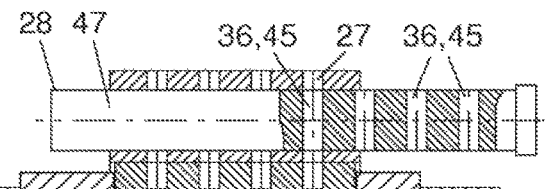
FIG. 13d is a sectional view showing the arrangement from FIGS. 11 and 12 with another of different operating positions of the metering device.
Figure 13C:
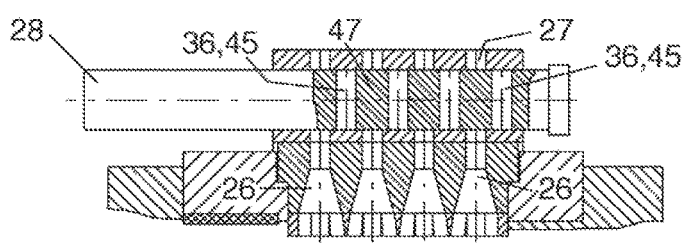
FIG. 13c is a sectional view showing the arrangement from FIGS. 11 and 12 with another of different operating positions of the metering device.
Figure 13B:
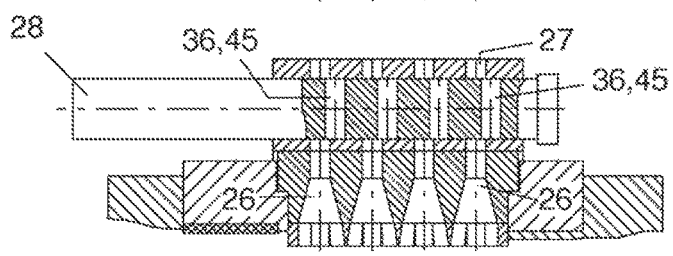
FIG. 13b is a sectional view showing the arrangement from FIGS. 11 and 12 with another of different operating positions of the metering device.
Figure 13A:
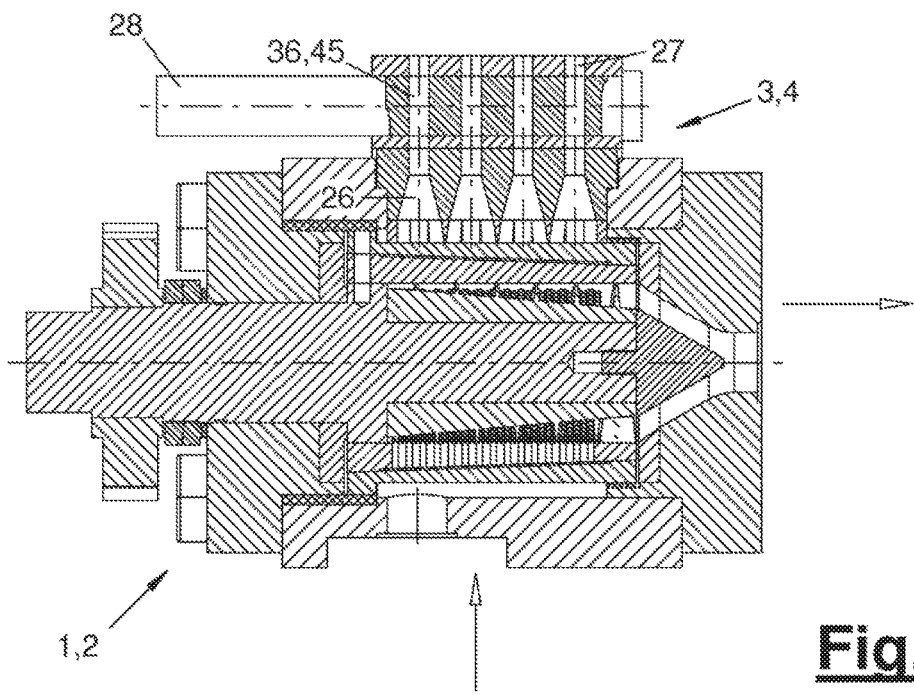
FIG. 13a is a sectional view showing the arrangement from FIGS. 11 and 12 with one of different operating positions of the metering device.

FIG. 13*a* corresponds to the view of FIG. 11 and shows the complete filtering device (1). In the operating and open position of FIG. 13*a*, all transverse channels (45) adjoin the feed lines and the discharge lines (26, 27) in a flush manner and permit the maximum flow of a stream of material.

In the operating and reduced position of FIG. 13*b*, the metering element (28) is displaced a bit along the axis (29), such that the transverse channels (45) and the feed lines and discharge lines (26, 27) overlap only partly. Accordingly, the flow cross section and flow rate of the separated filter residues are reduced.

In the operating and blocked position of FIG. 13*c*, the transverse channels (45) are offset laterally at a distance to the feed lines and discharge lines (26, 27), with their openings being closed by the massive areas (47).

FIG. 13*d* shows a further metering possibility with an extended metering element (28). This element is displaced so far to the side that only one transverse channel (45) is coupled with a feed line and discharge line (26, 27). The other feed lines and discharge lines (26, 27) are closed by the extended massive area (47). Depending on the sliding position, the number of transverse channels (45) participating in the discharge of material can thus be varied.

In another variant, not shown, the shaft-like metering element (28) can be rotated about the axis (29). The flow connection of the transverse channels (45) to the feed lines and discharge lines (26, 27) can be affected by this. FIG. 12 shows the flush flow position. With a rotation by, e.g., 90°, a blocked position is reached by the massive area (47) and a flow position is again reached with a further rotation by 90°.

The metering element (28) can release and meter the flow of separated filter residues in the manner described above continuously or intermittently. In addition, a portioning is possible. When the receiving pocket (36), which is open at both ends, or the transverse channel (45) is displaced and/or rotated into a blocked position in the filled state, the portion of material contained is inserted and again pushed out by the material pressure (P) and the afterflowing residue material during the next time a passage position or flow position is assumed. At the same time, the receiving pocket (36) or the transverse channel (45) is filled again and can then be closed by a new sliding or rotating movement. A timed discharge of material in portions can take place in this way.

FIGS. 14 and 15 show a first modification of a discharge device (3) and a metering device (4) of FIGS. 11 and 12. The filtering device (1) and the cleaning device (2) can have the same design as in FIGS. 11 and 12. The discharge device (3) in turn has one or more feed lines (26) adjoining the collection area (23). The metering device (4) has a metering element (28), which is configured as a shaft and which can rotate about a central axis (29) by means of a rotary drive (38). Additionally, it can optionally also be displaced axially by a slide drive, not shown.

The metering element (28) has a plurality of receiving pockets (36), each of which is formed by a shortened transverse channel (45) which opens at the shaft jacket, on the one hand, and at an axially common central channel (46), on the other hand. The transverse channels (45) are arranged offset to one another in the circumferential direction and direction of rotation in relation to the axis (29). They can also be associated with a feed line (26) each, with which they reach the flow position once per rotation. The feed line (26) is closed by the massive area (47) over the rest of the rotation path. The central channel (46) is connected to a discharge line (27) or can form same. As an alternative to a common central channel (46), a plurality of individual channels that are parallel and lie axially on the inside can be present.

Figure 18:
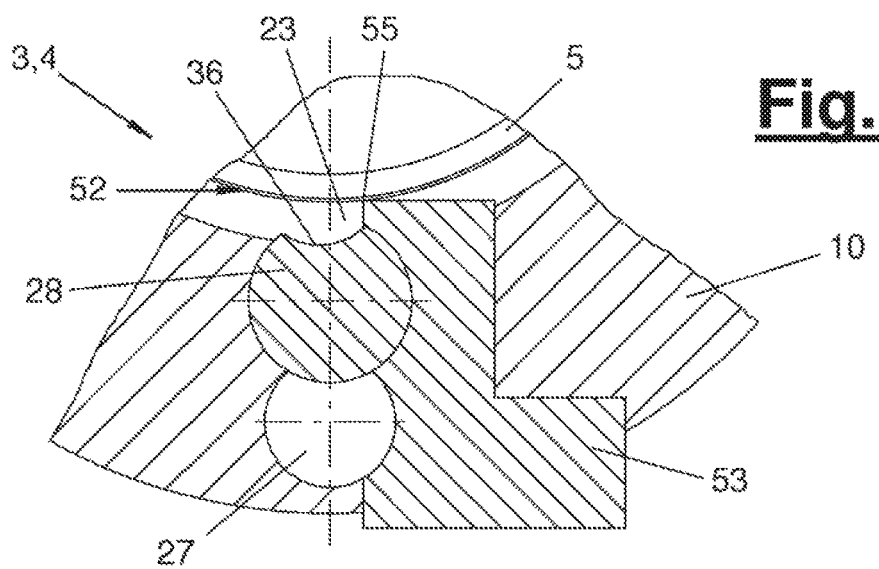
FIG. 18 is a detail view of the metering device from FIG. 16 with a scraper in one of various operating positions.
Figure 19:
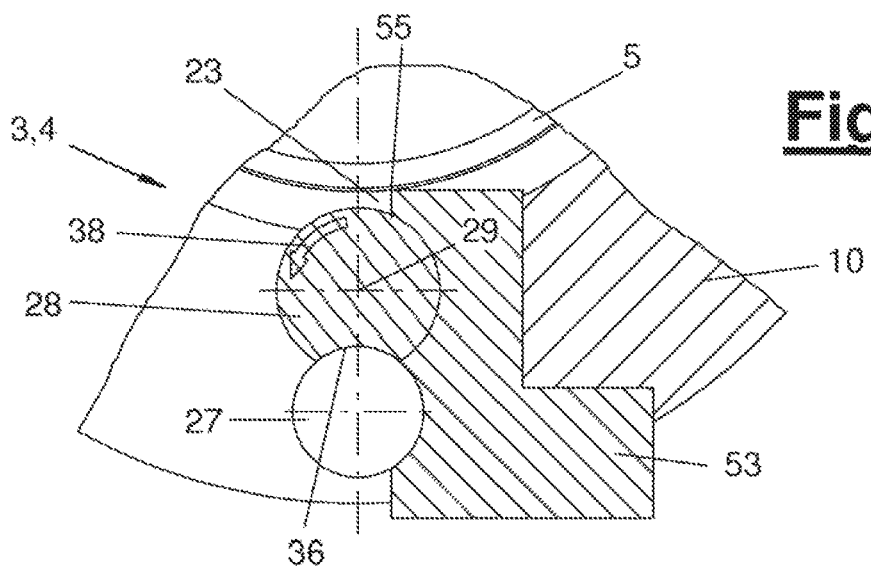
FIG. 19 is a detail view of the metering device from FIG. 16 with a scraper in another of various operating positions.
Figure 20:
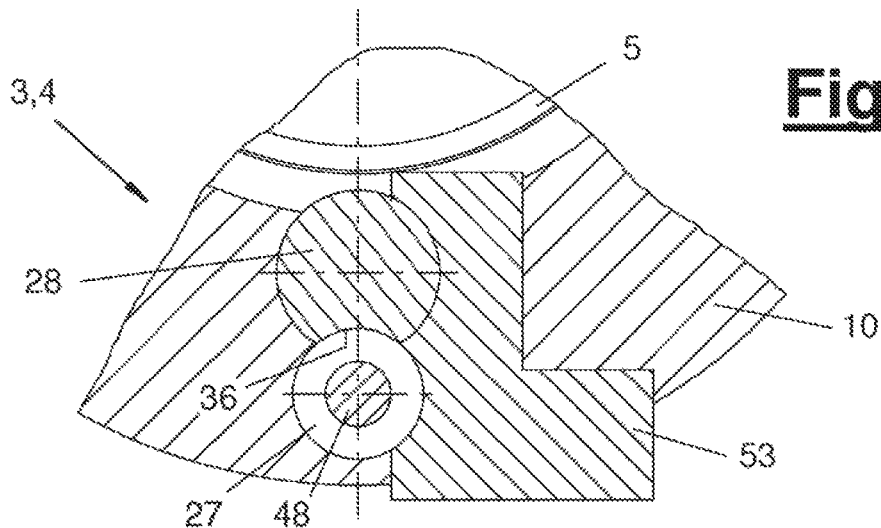
FIG. 20 is a detail view of the metering device from FIG. 16 with a scraper in another of various operating positions.

FIGS. 16 and 17 as well as the corresponding detail views of FIGS. 18 through 20 show a second modification of the filtering device (1), the cleaning device (2) and the discharge device (3) together with a metering device (4). This modification brings about a discharge of material in portions. The filter (5) is here in turn configured as a rotating tubular filter of the type described in the introduction, through which flow is possible from the outside to the inside, and the filter residues are deposited on its outer filter surface (52).

Here as well, the cleaning device (2) has a separating device (18) for the filter residues, which is configured as a mechanical separator (20) in a modification of the exemplary embodiments mentioned above. The separator (20) has a scraper (53), which is placed transversely and radially or obliquely to the filter surface (52) and to the direction of rotation of the filter symbolized by an arrow and which lifts off the filter residues. In this variant, the scraper (53) is configured as a scraping bar, mounted in the housing (10), with a massive scraping edge (55) on a bar edge, which is placed relatively steeply and almost radially to the rotating filter surface (52).

The collection area (23) is formed in the separator (20) in front of the scraper (53). The metering device (4) is, in this case, integrated into the housing (10) of the filtering device (1) and protrudes into the ring area of the filter chamber (11), which encloses the filter (5) on the outside. The metering device (4) has in turn a movable metering element (28), which is configured here as a rotating shaft and is provided with a rotary drive (38). The metering element protrudes into said ring area and is in direct connection with the collection area (23). The discharge device (3) has in this case only one discharge line (27).

The metering element (28) extending along the filter jacket has one or more peripheral receiving pockets (36) on the shaft jacket, which are filled with filter residues from the collection area (23) in a timed manner corresponding to the rotary movement and are emptied at the discharge line (27). The receiving pocket(s) (36) is/are configured, e.g., as an axial groove-like recess or depression on the shaft jacket. The metering element (28) is tightly enclosed by the scraping bar in some areas on one side.

The dynamic pressure in the collection area (23) can be affected by means of a coordinated shape and arrangement of the metering element (28) and of the scraper (53).

According to FIGS. 16 and 18, the rotating metering element (28) receives in its groove (36) the filter residues separated from the scraping edge (55) and located in the collection area (23) lying in front of it and transports them during a further rotation in the arrow direction to a discharge line (27), which adjoins the metering element (28) peripherally and extends parallel to same along the axis (15, 29). FIGS. 17, 19 and 21 show the discharge position, in which the filter residues drop from the receiving pocket (36) into the discharge line (27) preferably lying directly under it.

The emptying of the pocket can be supported according to FIGS. 17 and 20 by a clearing element (48) arranged in the discharge line (27), which is configured, e.g., as a plunger or scraper which can be displaced axially in a controlled manner or as a feed screw. The discharge line (27), which has a preferably circular cross section, and optionally the clearing element (48) as well as the groove-like receiving pocket (36) can have a mutually adapted shape and curvature, and the clearing element (48) meshes mechanically with the receiving pocket (36).

FIGS. 21 and 22 show a further modification of the discharge device (3) and the metering device (4), and the filtering device (1) and the cleaning device (2) with the separator (20) and the bar-shaped scraper (53) are designed corresponding to the previous exemplary embodiment of FIGS. 16 and 17.

In the variant of FIGS. 21 and 22, the metering element (28) is configured as a plunger which can be displaced axially and moved by means of a controlled drive (44). This plunger can have a circular shape in cross section. Moreover, it can additionally be mounted in a rotatable manner and can be optionally provided with a rotary drive (38). The plunger protrudes into said ring area of the filter chamber (11) and can be mounted in the housing (10).

The metering element (28) has a plurality of receiving pockets (36), which are configured here as annular depressions on the shaft jacket and are axially separated from one another by annular webs. The metering element (28) can have a plurality, e.g., two pocket areas that are axially spaced apart from one another, with a longer massive area (47) arranged between them. Broader massive areas (47) can likewise be arranged at the shaft ends.

The pocket areas and the central massive area (47) of the metering element (28) are brought into connection with the collection area (23) alternately by a reversing sliding movement. The separated filter residues are received in the annular receiving pockets (36). The receiving pockets (36) are opened toward the collection area (23) and are otherwise tightly enclosed by the wall of the housing (10) and of the scraper (53).

The metering element (28) is then axially displaced, as a result of which the filled receiving pockets (36) are transported into a discharge area, not shown, or to a discharge line (27), where they are emptied due to gravity or with optionally support by a clearing element or by a flushing or the like. In the meantime, the central massive area (47) or the other pocket area can selectively be located at the collection area (23). A discharge of material in portions is likewise obtained with this variant of a metering device (4).

The modification shown in FIGS. 23 and 24 differs from the exemplary embodiment of FIGS. 21 and 22 by a different form of the metering element (28). This metering element has a plurality of smaller receiving pockets (36), in the form of trough-like depressions, arranged behind one another on the jacket. Two pocket areas, which are defined by a central massive area (47) and by massive areas at the ends, are present here as well. The trough-like receiving pockets (36) can be arranged behind one another in an axial row. Such a pocket form can, as an alternative, also be used in the previous exemplary embodiment of FIGS. 16 and 17.

FIGS. 25 through 26c show a further variant of a discharge device (3) together with the metering device (4), which is combined here with a mechanical separator (20), e.g., a scraper (53) according to the previous exemplary embodiments of FIGS. 16 through 24. The filtering device (1) is otherwise the same as in the previous exemplary embodiments.

The metering element (28) has a similar design as a displaceable shaft or plunger with a slide drive (44) as in the first exemplary embodiment of FIGS. 11 and 12. The metering element has one or more receiving pockets (36) in the form of transverse channels (45) traversing the shaft body, which can have an identical or different angular alignment and which correspond in number, size and alignment with subsequent feed lines and discharge lines (26, 27). By means of axial displacement, the metering element (28) can assume different operating positions according to FIGS. 26a-c.

FIG. 26a shows the flow position or open position. FIG. 26b shows a reduced position with only partial overlapping of transverse channels (45) and feed lines and discharge lines (26, 27) as well as correspondingly reduced flow rate. FIG. 26c shows the blocked position, in which the feed lines and discharge lines (26, 27) are closed and blocked by massive areas (47).

Also in the variant of FIGS. 25 through 26c, the metering element (28) can, in addition or as an alternative, perform a rotary movement and have a corresponding rotary drive (38) for this.

Figure 28:
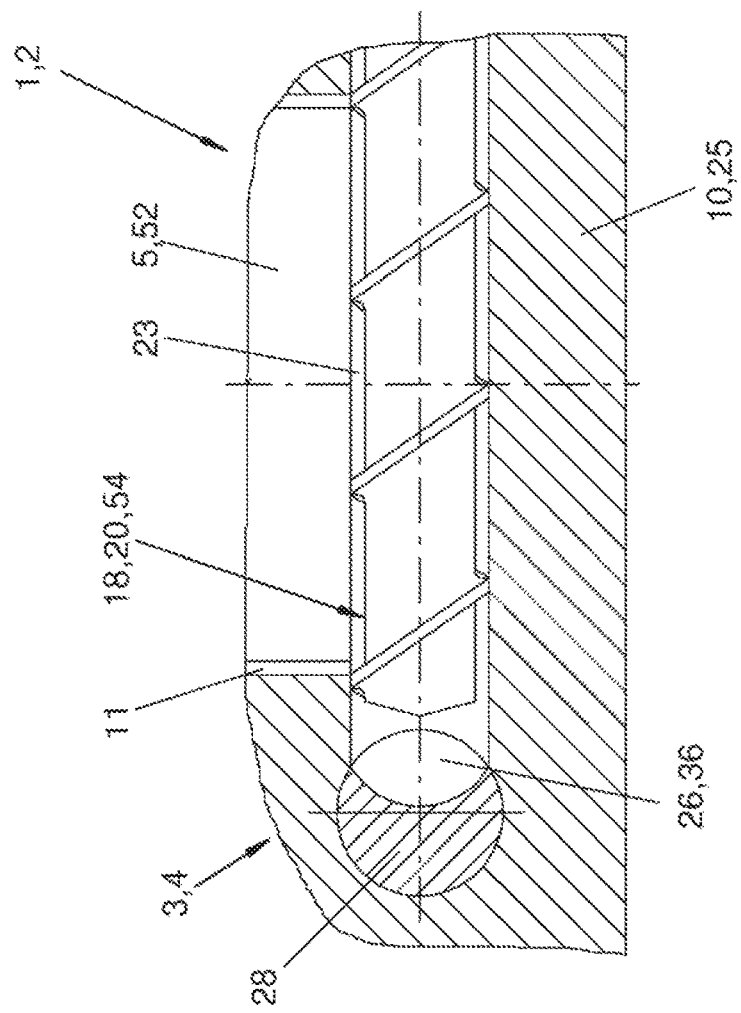
FIG. 28 is a tilted detail view showing a mechanical separator for separating filter residues with a lifting screw.
Figure 27:
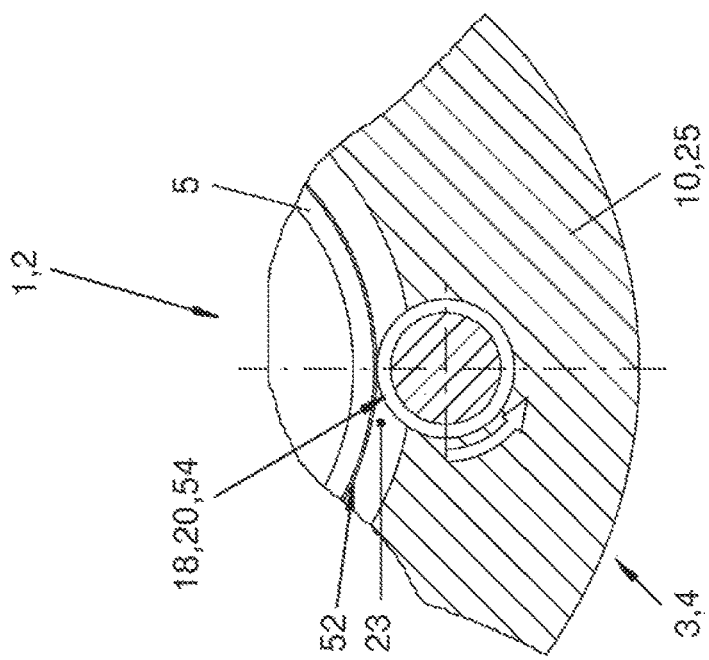
FIG. 27 is a cut-away view showing a mechanical separator for separating filter residues with a lifting screw.

FIGS. 27 and 28 show a further modification of the cleaning device (2) and the discharge device (3) together with the metering device (4). The separating device (18) is in turn configured as a mechanical separator (20) and is structurally configured here as a lifting screw (54). This mechanical separator is mounted in the housing (10) and extends, e.g., in the axial direction on and along the filter surface (52) of the rotating tubular filter (5). The lifting screw (54) lifts off the filter residues from the filter surface (52) during a rotation and transports them to an axially adjoining feed line (26) in the housing (10), which is in connection with a metering element (28) of the type described above. This metering element can be, e.g., a shaft or plunger with one or more peripheral receiving pockets (36) according to one of the above-described exemplary embodiments of FIGS. 11 through 26. The lifting screw (54) is provided with a controlled drive, which is switched on and off as needed.

Figure 29:
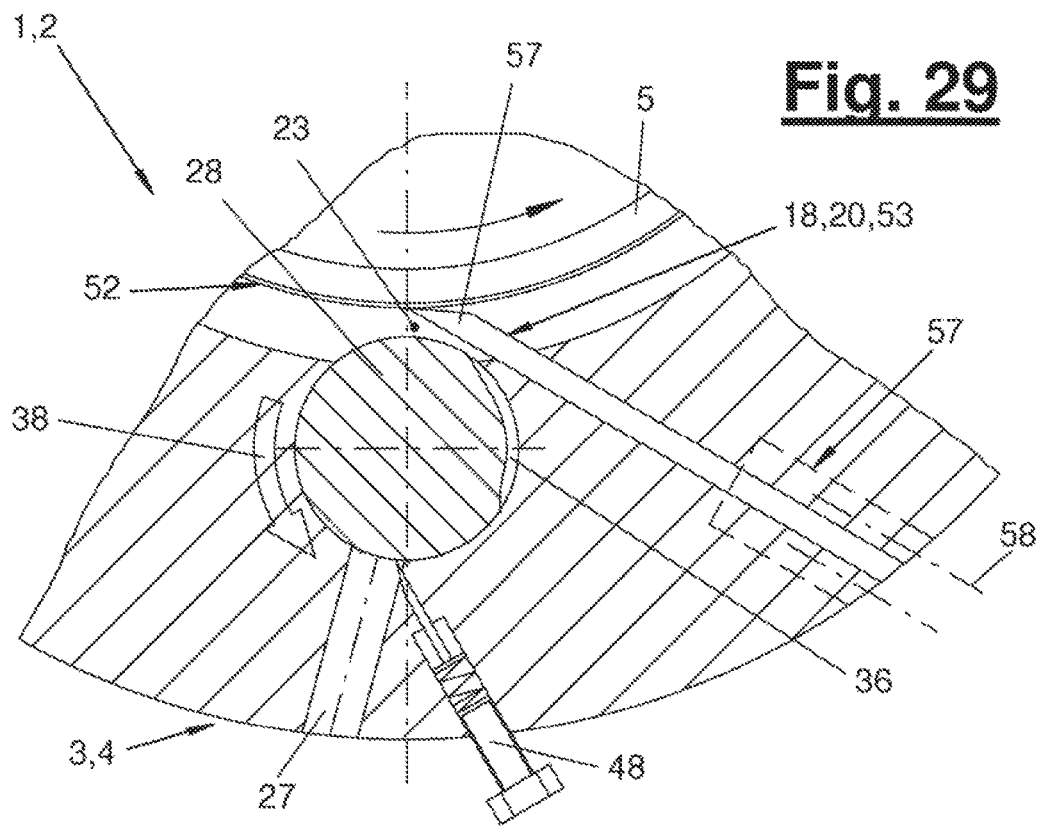
FIG. 29 is a sectional view showing another modification of a metering device with a clearing element in one of various operating positions.
Figure 30:
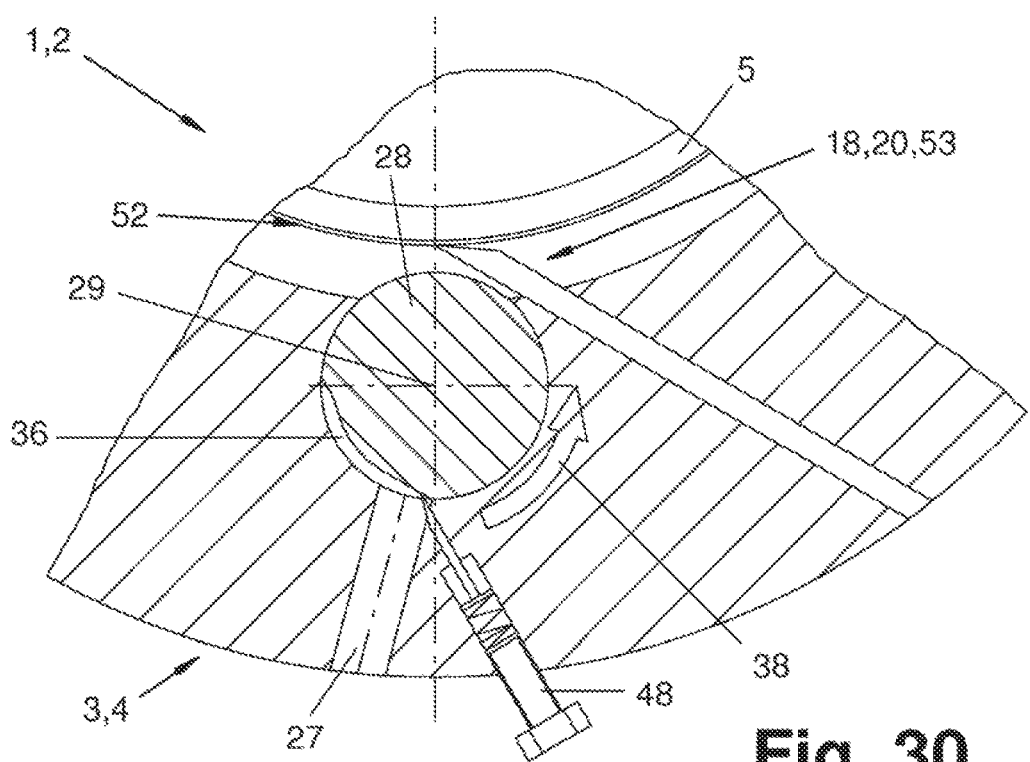
FIG. 30 is a sectional view showing another modification of a metering device with a clearing element in another of various operating positions.

FIGS. 29 and 30 show a further modification of the discharge device and metering device (3, 4) and the cleaning device (2). A mechanical separation of the filter residues from the filter surface (52) moved past takes place here as well, and a scraper (53) with a blade (56) is used. The blade (56) is placed obliquely and against the direction of rotation of the filter symbolized by an arrow on the filter surface (52). The, e.g., thin blade (56) can have a blade holder (57) suggested by dotted lines. The blade holder (57) arranged in the housing (10) can be moved and placed against the filter (5) with an adjusting means (58), likewise symbolized in dotted lines, e.g., with adjusting screws and optionally with a spring support.

The metering element (28) is configured as a rotatable cylindrical shaft and is provided with a rotary drive (38), the shaft having one or more peripheral receiving pockets (36), which are configured as trough- or groove-like depressions on the shaft jacket. The metering element (28) in turn protrudes into said ring area and the collection area (23). On another side, it is connected to a discharge line (27). The receiving pockets (36) are flatter in this exemplary embodiment than in the variants described above and have a greater extension in the circumferential direction. The pocket bottom is arched convexly, preferably concentrically to the axis of rotation (29).

A clearing element (48), which is arranged in the mouth area of the discharge line (27) in the housing (10), is provided for the reliable emptying of the receiving pocket(s) (36) filled with filter residues in portions. The clearing element (48) is configured here as a scraper with a spring-loaded blade, which is placed obliquely against the direction of rotation of the metering element (28) and against the arched pocket bottom. The scraper (48) can be adjusted by means of an adjusting screw or the like.

Figure 31:
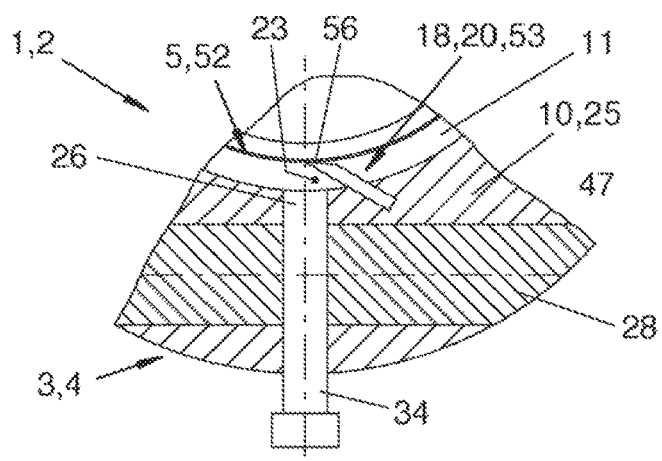
FIG. 31 is a sectional view showing a modification of the metering device in one of various operating positions.
Figure 32:
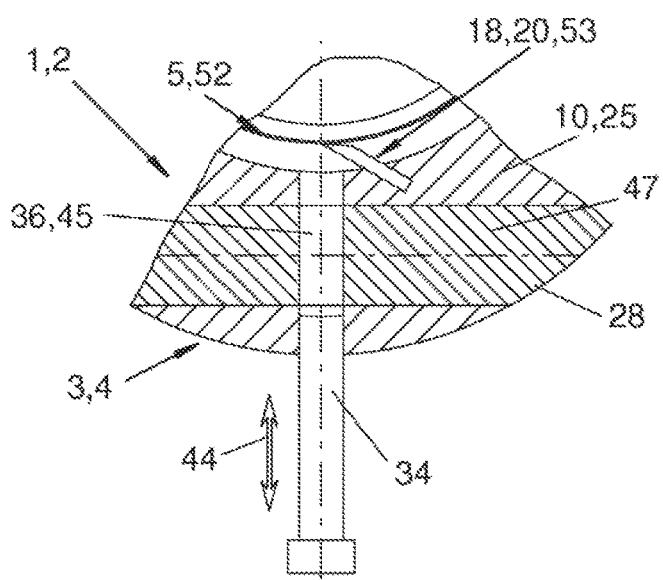
FIG. 32 is a sectional view showing a modification of the metering device in another of various operating positions.
Figure 33:
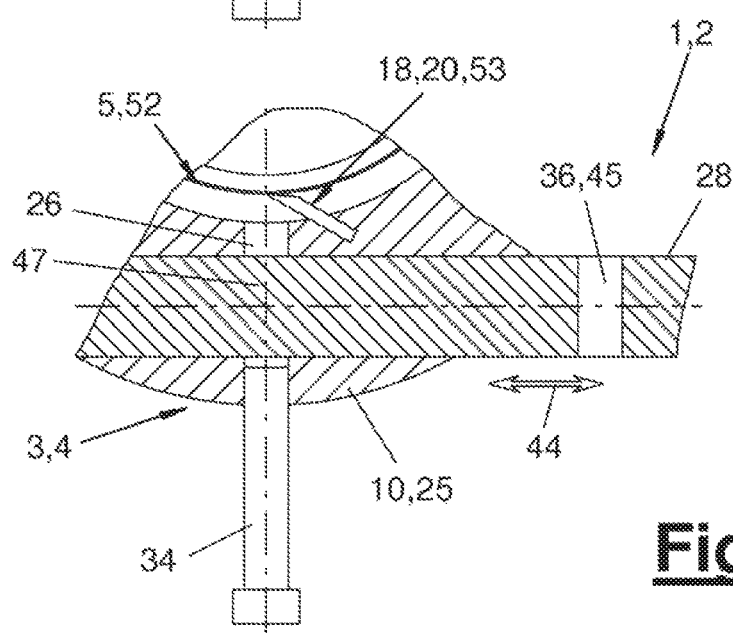
FIG. 33 is a sectional view showing a modification of the metering device in another of various operating positions.

FIGS. 31 through 33 show a further variant of the discharge device and metering device (3, 4) for a discharge of material in portions. The cleaning device (2) can have a separating device (18) having any design, especially according to the previous variants, which is configured here, e.g., as a mechanical separator (20) with a scraper (53).

The discharge device (3) has one or more feed lines (26) opening at the collection area (23). The metering element (28) is configured as an axially displaceable plunger that has one or more receiving pockets (36) in the form of a traversing transverse channel (45), which lines up precisely in the flow position and is flush with a feed line (26). The plunger (28) is moved in the axial direction in a manner controlled by a slide drive (44). The direction of movement can be aligned obliquely to the filter axis (15). A plurality of receiving pockets (36) can be arranged in a row along the filter jacket and the filter axis (15).

The metering device (4) has, in addition, a piston (34), of which one or more can be present, and it is aligned flush with a feed line (26). The piston (34) can traverse the transverse channel (45) and dip into the feed line (26). It is moved in the axial direction in a controlled manner by a slide drive (44).

FIG. 31 shows a blocked position of the metering device (4), in which the piston (34) is extended and traverses the flush arrangement of the transverse channel (45) and the feed line (26), and the front piston end protrudes up to the edge of the filter chamber (11) or to the ring area of same and lines up precisely with the housing wall (10) there. Filter material that is separated in the collection area (23) in front of the scraper (53), which is equipped, e.g., with a blade (56), is collected in this blocked position.

In the next operating position or receiving position of FIG. 32, the piston (34) is pulled back from the feed line (26) and the transverse channel (45) and permits entry of the separated filter residues. In this case, the piston forms the bottom of the receiving pocket (36) at the same time.

FIG. 33 shows the discharge position, in which the metering element (28) with the filled receiving pocket (36) is displaced to the side, the massive area (47) closing the feed line (26). The receiving pocket (36) is in this case brought into a discharge area, which optionally lies outside of the housing (10) and in which the pocket can be emptied by gravity or a clearing element or in another suitable manner. Subsequently, the metering element (28) is again driven back into the initial position of FIG. 31 and the piston (34) is pushed forward, and the metering process in portions can begin anew. As an alternative, the piston (34) can be dispensed with, and the housing (10, 25) closes the receiving pocket (36) downwards.

Figure 34:
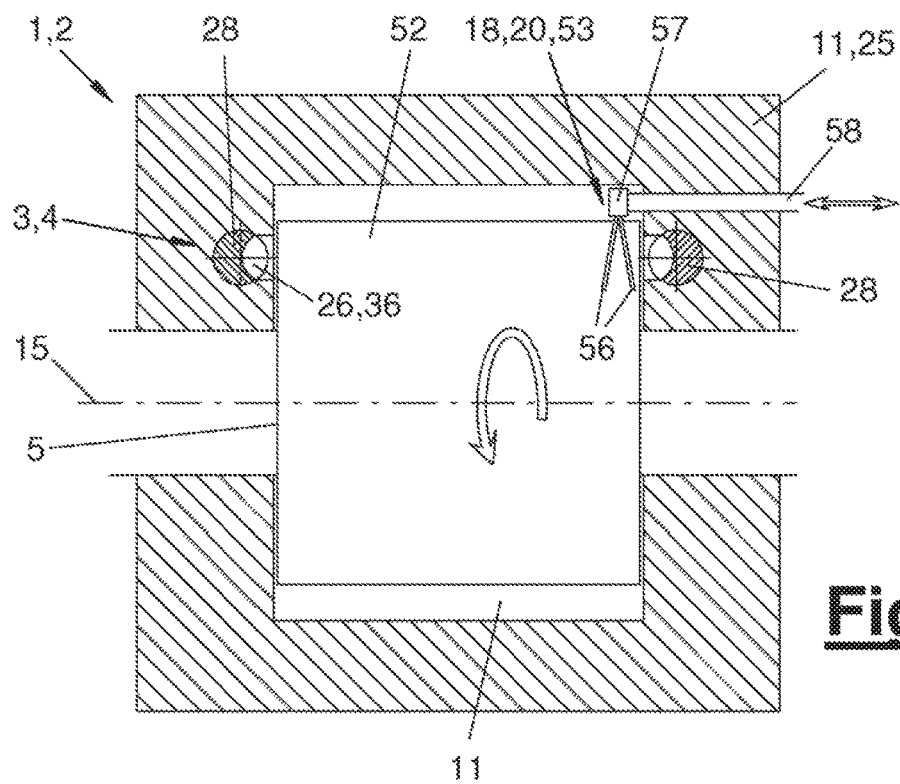
FIG. 34 is a sectional view showing a modification of the cleaning device shown in FIG. 11 with another separating device for filter residues in one of various operating positions.
Figure 35:
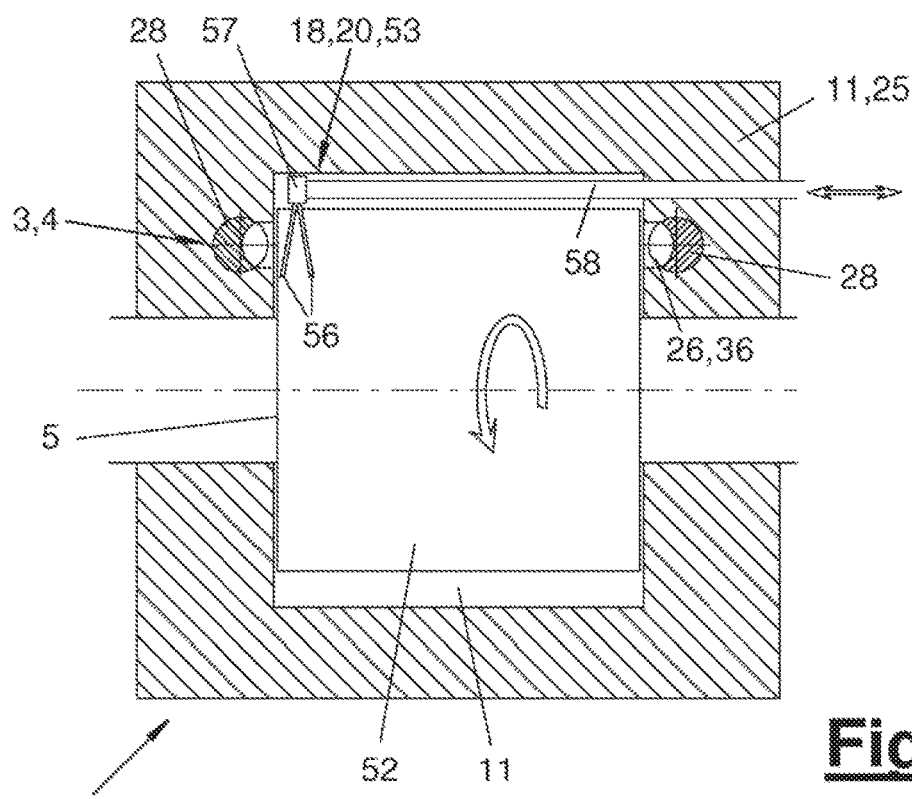
FIG. 35 is a sectional view showing a modification of the cleaning device shown in FIG. 11 with another separating device for filter residues in another of various operating positions.

FIGS. 34 and 35 show another exemplary embodiment of a filtering device (1), a cleaning device (2), a discharge device (3) as well as a metering device (4). The filter (5), rotating about an axis (15) in the filter chamber (11), is permanently or intermittently acted upon on its filter surface (52) by a mechanical separator (20). The separator (20) is configured as a movable scraper (53) in this case, which is provided with a blade holder (57) having one or more, e.g., two V-shaped, aligned blades (56). The blade holder (57) is connected to an adjusting means (58), which brings about with a suitable drive a scraper and blade movement along the filter surface (52). The adjusting means (58) can be configured, e.g., as a slide, which generates a movement parallel to the axis (15) of the tubular filter (5). The blades (56) are placed on the filter surface (52) and are moved along on this surface, and they separate the filter residues and transport them to an axially adjoining feed line (26) as well as transfer them to a metering element (28) there according to one of the above-described exemplary embodiments. The different blade slopes are favorable for the scraping and conveying process in the respective direction of movement.

Figure 36:
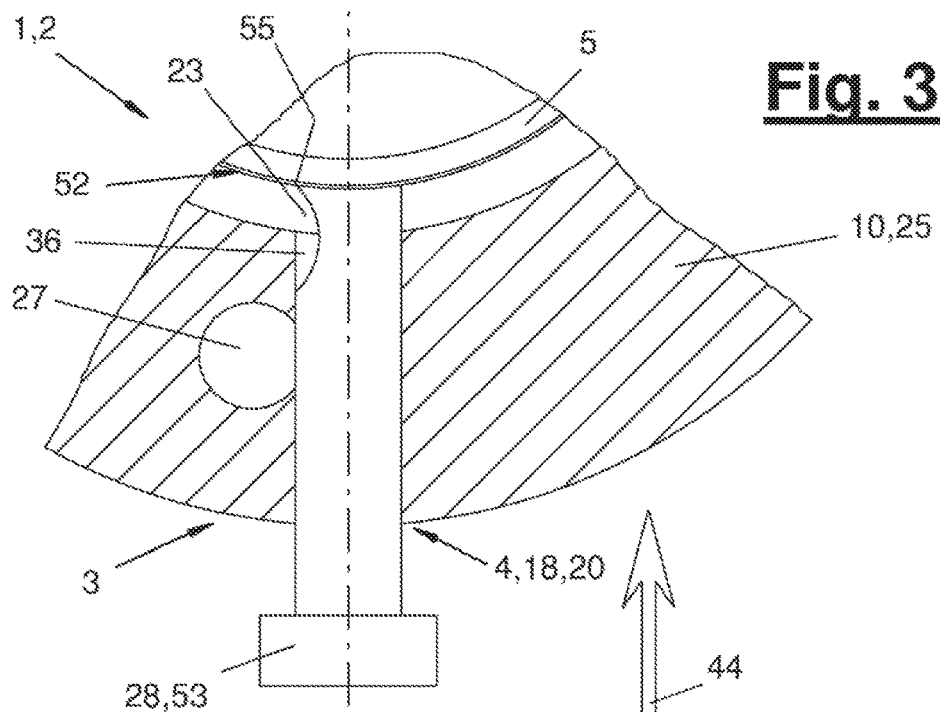
FIG. 36 is a sectional view of another modification of the metering device in one of various operating positions.
Figure 37:
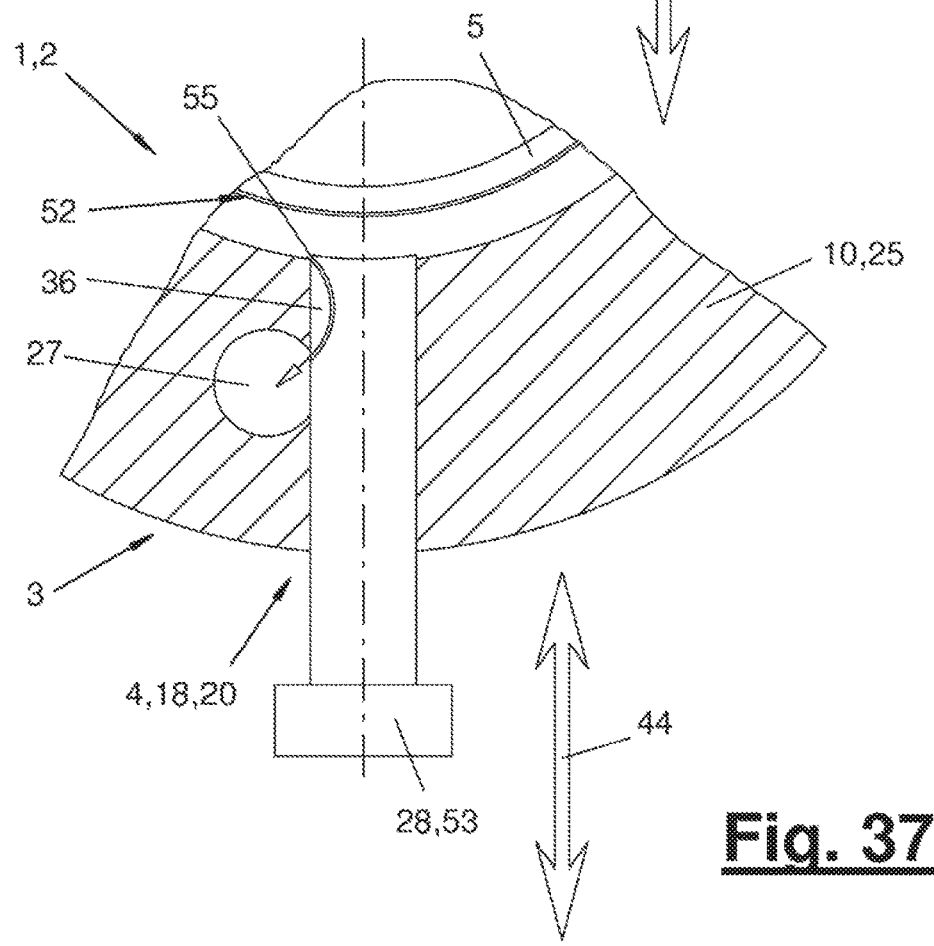
FIG. 37 is a sectional view of another modification of the metering device in another of various operating positions.

The variant of FIGS. 36 and 37 shows a combination of a separating device (18), in particular a mechanical separator (20), with a metering device (4) and a discharge device (3). The metering device (4) has a metering element (28), which is configured as an axially displaceable plunger and at the same time as a scraper (53). The metering element is used for discharging material in portions. The metering device (4) and the mechanical separator (20) form a structural and functional unit.

The metering element (28) has an alignment with a predominantly radial direction component to the filter axis (15) and is mounted in the housing (10). The metering element (28) can be moved with its front side up to in said ring area of the filter chamber (11) and onto the filter surface (52). At the front end, the metering element (28) has one or more lateral receiving pocket(s) (36), which can be configured as a trough- or groove-like depression. A scraping edge (55) for separating filter residues is arranged or formed at the transition of the receiving pocket(s) (36) to the front side of the plunger (28), especially at the edge of the pocket.

The metering element (28) is guided in a housing opening and is acted upon by a slide drive (44). The receiving pocket (36) can have such a long axial length that it extends a bit into said housing opening in the extended plunger position. Consequently, the receiving pocket (36) is, on the one hand, open to the collection area (23) for an entry of separated filter residues and, on the other hand, has an area partly covered by the housing wall. FIG. 36 shows this embodiment.

A discharge line (27), into which a pocket can be emptied, is arranged at a suitable place in the area of movement of the metering element (28), e.g., in the housing wall. The discharge line (27) arranged to the side of the plunger can have a circular channel shape and can extend along the axis (15). The shape of the pocket bottom can correspond to the cross-sectional shape of the line (27) and can complement same, e.g., in the emptying position to form a circular cross-sectional shape. The emptying can be supported by a clearing element (not shown).

In the above-described variants of the metering device (4) with a movable metering element (28), the shape and alignment of the metering element (4) can depend on the respective filter geometry. In the exemplary embodiment shown, a tubular filter (5) is used. As an alternative, a disk filter or a filter (5) with a different filter geometry is possible.

The metering element (28) can extend along the filter axis (15) and have a length corresponding at least to the filter length. This is especially the case in the variants, in which the metering element (28) protrudes up to into the filter chamber (11) and into the ring area. In the embodiment of FIGS. 36 and 37, the plunger (28) can have a strip or plate shape. In the variant of FIGS. 31 through 33, the piston (34) can also have an elongated strip or plate shape.

Figure 38:
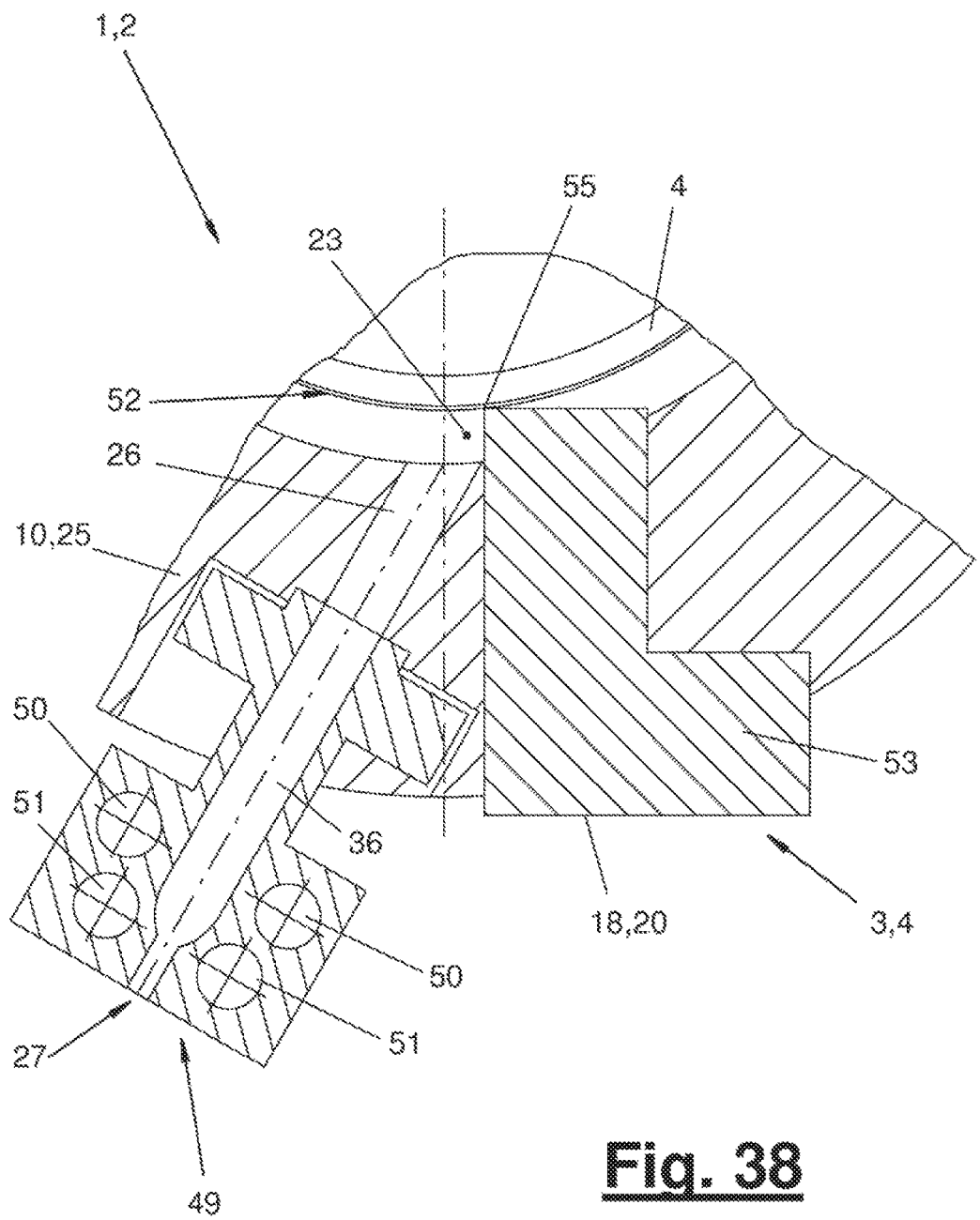
FIG. 38 is a sectional view showing another modification of the discharge device and the metering device.

FIG. 38 shows a variant of the discharge device (3) and of the metering device (4), in which the metering device (4) has a metering element (28) with a strengthening device (49).

The filtering device (1) and the cleaning device (2) together with the separating device (18) can be configured in any way and especially according to one of the above variants. A mechanical separator (20) with a scraper (53) is used in the exemplary embodiment shown. The discharge device (3) has one or more feed line(s) (26) opening to the collection area (23), which are optionally permanently connected at the other end to a channel-like receiving pocket (36) in the metering element (28). The one or more receiving pocket(s) (36) present may have a contraction at its rearward end. At least one discharge line (27) can be connected behind it. The metering element (28) has a body which can be mounted at the housing (10, 25), which receives the receiving pocket(s) (36) and parts of the reinforcing device (49).

The reinforcing device (49) has an effect on the flowability, especially the state of aggregation of the separated filter residues and the fluid particles, especially plastic particles, contained therein. This mass or mixture may be, e.g., solidified or liquefied. Accordingly, this mass can pass or not pass the receiving pocket(s) (36) and especially the contraction thereof at the end. A solidified mass forms a plug, which blocks the receiving pocket (36) and prevents a discharge of material. Residue material with fluid particles can be discharged in a stream or in portions due to the corresponding control of the reinforcing device (49).

The change in flow behavior, especially a solidification and liquefaction, can take place in different ways. This happens thermally in the exemplary embodiment shown and preferred. A solidification takes place due to a feeding of cold and a liquefaction due to a feeding of heat. The reinforcing device (49) has a suitable cooling device (50) and a heating device (51) for this. The cooling device and heating device (50, 51) can have external cooling and heating units and lines connected there for a medium transmitting heat and cold, which are guided up to the metering element (28) and in the vicinity of the receiving pocket(s) (36). The cooling and heating lines can be arranged behind one another in the mentioned sequence in the discharge device.

As an alternative, the cooling device and/or heating device (50, 51) can be completely attached to the metering element (28) and be supplied from the outside with operating materials, especially current and water. In a further modification, the solidification and liquefaction can take place by means of other measures, e.g., by chemical reaction with the addition of a reactant or catalyst or by applying electric or electromagnetic fields. The reinforcing device (49) can also bring about a stop of the flow of the mass due to magnetic force under the effect of magnetically conductive mass components.

The embodiments of FIGS. 16 through 38 with the various embodiments of the discharge device (3) and optionally of the cleaning devices (2) have each an independent inventive importance. In particular, the discharge devices (3) can adjoin a collection area (23) directly and without a feed line (26). They can also be arranged on or at the filter housing (10).

In variation to FIGS. 16 through 38, the discharge devices (3) being shown here can be connected to a collection area (23) via a feed line (26) as well. This can take place, e.g., according to one of the embodiments according to FIGS. 1 through 15.

The metering device (4) for the discharge of a movable mass (9), especially of separated filter residues, from a processing space under pressure likewise has independent inventive importance and can also be used in any other cleaning and discharge devices (2, 3). In this case, the metering device (4) has a metering element (28), which is axially displaceable or rotates about an axis (29), especially a shaft, with one or more receiving pocket(s) (36) arranged on the outer side of the metering element (28) and variable in their volume by means of an actuator (33) with a plunger

(34) for receiving and discharging a portion (35) of the mass (9), and the actuator (33) has an adjusting device (39) for varying the plunger stroke. The further structural and functional details can be configured according to FIGS. 9 and 10.

Further modifications of the above-described exemplary embodiments and the further variants are possible in a variety of ways.

On the one hand, the flow direction of the fluids can be reversed by the filters (5, 6). In particular, the flow direction from inside to outside can be directed with a tubular filter (5).

Further, a kinematic reversal of the filter rotation is possible. The filter (5, 6) can be arranged in a stationary manner, and the cleaning device (2) and optionally also the discharge device (3) and the metering device (4) rotate about an axis (15).

The filter may have any shape and design. Instead of the tubular filter (5) shown, a disk filter or a different filter can be used. A disk filter or other filter is likewise preferably moved, in particular rotated about an axis (15). With the different filter geometry, the association and alignment of the components of the cleaning device (2), of the discharge device (3) and of the metering device (4) are changed correspondingly. In particular, the components of the separating device (18) have a correspondingly changed alignment and arrangement.

A driven clearing element (48) and/or the lifting screw (54) can have a drive that can be controlled and optionally regulated. This drive can be controlled or regulated independently of a rotary drive of the filter (5).

In addition, the features of the above-described exemplary embodiments and their modifications can be combined with one another in a variety of ways and can especially be interchanged.

While specific embodiments of the invention have been shown and described in detail to illustrate the application of the principles of the invention, it will be understood that the invention may be embodied otherwise without departing from such principles.

The invention claimed is:

1. A filtering device comprising:
 a filter;
 a cleaning device disposed adjacent to the filter and operatively connected to the filter for cleaning the filter, the cleaning device comprising:
  a separating device for separating filter residues from the filter;
  a collection area receiving residues from the separating device;
  a feed line; and
  a discharge device connected to the collection area by the feed line for discharge of separated filter residue, wherein the discharge device, in connection with the feed line, comprises a controllable metering device which closes the feed line and receives a metered portion of separated filter residue from the feed line, the metered portion being received at a receiving location of the feed line and the metered portion being discharged by the metering device at a different discharge location from the receiving location.

2. A filtering device in accordance with claim 1, wherein the metering device has a metering element which can be moved in a controllable manner whereby the metering element is arranged displaceably or arranged rotatably displaceably.

3. A filtering device in accordance with claim 1, wherein the metering device is arranged between the feed line and a discharge line of the discharge device.

4. A filtering device in accordance with claim 1, wherein the metering device further comprises a plurality controllable drives and a metering element movable on multiple axes the controllable drives being connected to the metering element for driving the metering element.

5. A filtering device in accordance with claim 2, wherein the metering element has a massive area and one or more receiving pockets for receiving and discharging a portion of separated filter residue and the one or more receiving pockets has a variable volume.

6. A filtering device in accordance with claim 5, wherein the metering element comprises a shaft with an actuator decreasing and increasing the pocket volume.

7. A filtering device in accordance with claim 6, wherein the actuator has a plunger which is movable and forms a pocket bottom, the plunger having a plunger stroke.

8. A filtering device in accordance with claim 7, wherein:
 the metering device comprises a rotating body with a receiving channel that is configured as a continuous channel with mouth openings on both sides;
 the discharge device further comprises a discharge line;
 the feed line and the discharge line are arranged in relation to one another and to the receiving channel such that the feed line and the discharge line are operatively connected, at the same time in at least one rotation position of the rotating body, with both mouth openings.

9. A filtering device in accordance with claim 7, wherein:
 the actuator has an adjusting device for changing an actuator stroke;
 the plunger stroke is adjusted as to a plunger stroke length by the adjusting device; and
 the adjusting device comprises an adjusting rod, which can be moved axially in a controllable manner, which protrudes into an enclosed adjusting opening, at the plunger, and the adjusting rod and the adjusting opening have adjusting wedge surfaces interacting and determining the plunger stroke.

10. A filtering device in accordance with claim 2, wherein the separating device comprises a backwash device or a mechanical separator or both a backwash device and a mechanical separator.

11. A filtering device in accordance with claim 10, wherein:
 the collection area comprises a plurality of collection channels;
 the metering element comprises a plurality of receiving pockets along a length of the metering element;
 the feed line comprises a plurality of feed lines connected to the collection channels with a number of feed lines and a location of the feed lines corresponding to a number and a location of the plurality of receiving pockets.

12. A filtering device in accordance with claim 10, wherein the filter and the cleaning device are arranged rotatably about an axis in relation to one another and the filter is configured as a disk filter or as a tubular filter.

13. A filtering device in accordance with claim 12, further comprising a housing with a filter chamber enclosing the filter, a feed unit for a fluid to be filtered as well as a discharge unit for the filtered fluid as well as a cleaning area.

14. A method for the discharge of filter residues, the method comprising:

providing a filtering device comprising: a filter; and a cleaning device disposed adjacent to the filter and operatively connected to the filter for cleaning the filter, the cleaning device comprising: a separating device for separating filter residues from the filter; a collection area; a feed line; and a discharge device connected to the collection area by the feed line for separated filter residue, wherein the discharge device, in connection with the feed line, comprises a controllable metering device comprising a metering element which closes the feed line and receives a metered portion of separated filter residue from the feed line, the metered portion being received at a receiving location and the metered portion being discharged by the metering device at a different discharge location from the receiving location;

separating the residues from a filter by the cleaning device;

feeding the separated filter residues from the collection area of the cleaning device via the feed line of the discharge device;

closing the feed line by the controllable metering device of the discharge device;

receiving and metering the separated filter residues at the metering device from the feed line in the metered portion; and discharging the received separated filter residues to the different discharge location, wherein the metering and the discharge of the separated filter residues take place by means of the metering element.

15. A method in accordance with claim 14, wherein the metering element is rotatable or displaceable or rotatable and displaceable, in a controlled manner and the metering element comprises receiving pockets, along a length of the metering element, receiving the metered portion.

16. A method in accordance with claim 14, wherein the transport and discharge of separated filter residues is driven via the material fluid pressure existing in the cleaning device.

17. A method in accordance with claim 15, wherein the transport and discharge of separated filter residues is driven via the material fluid pressure existing in the cleaning device.

18. A filtering device comprising:

a filter;

a cleaning device disposed adjacent to the filter and operatively connected to the filter for cleaning the filters, the cleaning device comprising:

a separating device for separating filter residues from the filter;

a collection area;

a feed line; and a discharge device connected to the collection area by the feed line for separated filter residue, wherein the discharge device, in connection with the feed line, comprises a controllable metering device which closes the feed line and receives a metered portion of separated filter residue from the feed line at a receiving location and discharges the metered portion at a different discharge location, the metering device comprising a receiving pocket defining the metered portion, and an actuator acting on a volume of the pocket for decreasing and increasing the pocket volume.

19. A filtering device in accordance with claim 18, wherein:

the metering device further comprises a metering element; and the receiving pocket is a variable volume receiving pocket and the actuator decreases and increases the pocket volume and the actuator comprises a controllable drive connected to the metering element for driving the metering element for decreasing and increasing the pocket volume.

20. A filtering device in accordance with claim 18, wherein the actuator comprises a movable piston which decreases and increases the volume of the receiving pocket.

* * * * *